(12) United States Patent
Pekin

(10) Patent No.: US 8,839,547 B2
(45) Date of Patent: Sep. 23, 2014

(54) REEL SYSTEM WITH LINE TENSION MEASUREMENT CAPABILITY

(76) Inventor: David Pekin, San Diego, CA (US)

( * ) Notice: Subject to any disclaimer, the term of this patent is extended or adjusted under 35 U.S.C. 154(b) by 1293 days.

(21) Appl. No.: 12/559,700

(22) Filed: Sep. 15, 2009

(65) Prior Publication Data

US 2010/0000143 A1 Jan. 7, 2010

Related U.S. Application Data

(63) Continuation-in-part of application No. 12/052,733, filed on Mar. 21, 2008, now Pat. No. 7,861,454, and a continuation-in-part of application No. 11/977,714, filed on Oct. 24, 2007, now Pat. No. 7,779,573, and a continuation-in-part of application No. 11/307,840, filed on Feb. 24, 2006, now Pat. No. 7,318,295.

(51) Int. Cl.
*A01K 89/00* (2006.01)
*A01K 97/00* (2006.01)
*A01K 97/12* (2006.01)

(52) U.S. Cl.
CPC .............. *A01K 89/00* (2013.01); *A01K 97/00* (2013.01); *A01K 97/125* (2013.01)
USPC .............................................. 43/17; 242/223

(58) Field of Classification Search
USPC .......................................... 43/4, 17; 242/223
See application file for complete search history.

(56) References Cited

U.S. PATENT DOCUMENTS

| | | | | |
|---|---|---|---|---|
| 4,051,616 A | * | 10/1977 | Mathauser | 43/17 |
| 4,650,161 A | * | 3/1987 | Kaneko | 242/224 |
| 4,983,612 A | | 1/1991 | Rittmann | |
| 5,479,831 A | * | 1/1996 | Hirose | 73/862.44 |
| 5,560,560 A | * | 10/1996 | Hirose | 242/223 |
| 5,639,038 A | * | 6/1997 | Hirose | 242/223 |
| 5,833,156 A | * | 11/1998 | Park et al. | 242/289 |
| 6,086,549 A | | 7/2000 | Neese et al. | |
| 6,591,222 B2 | * | 7/2003 | Stiner | 702/173 |
| 6,658,783 B1 | * | 12/2003 | Yamanaka | 43/25 |
| 7,559,499 B2 | * | 7/2009 | Nakagawa et al. | 242/246 |
| 7,727,117 B2 | | 6/2010 | Feldman et al. | |
| 7,779,704 B1 | | 8/2010 | Chu | |
| 7,895,908 B2 | | 3/2011 | Fujiwara et al. | |
| 2005/0200836 A1 | * | 9/2005 | Scorvo | 356/138 |
| 2011/0162465 A1 | | 7/2011 | Pekin | |

OTHER PUBLICATIONS

USPTO Office Action, May 18, 2012, re U.S. Appl. No. 12/835,520.

* cited by examiner

*Primary Examiner* — Darren W Ark
*Assistant Examiner* — Danielle Clerkley
(74) *Attorney, Agent, or Firm* — Larry K. Roberts

(57) ABSTRACT

An exemplary embodiment of a fishing reel includes a reel frame for supporting a line spool with a spool rotation axis, the line spool rotatably mounted one the reel frame. A reel foot is adapted for mounting to a fishing rod, wherein the reel foot is attached to the frame. A force measurement device is configured to produce a response indicative of a line tension force.

21 Claims, 23 Drawing Sheets

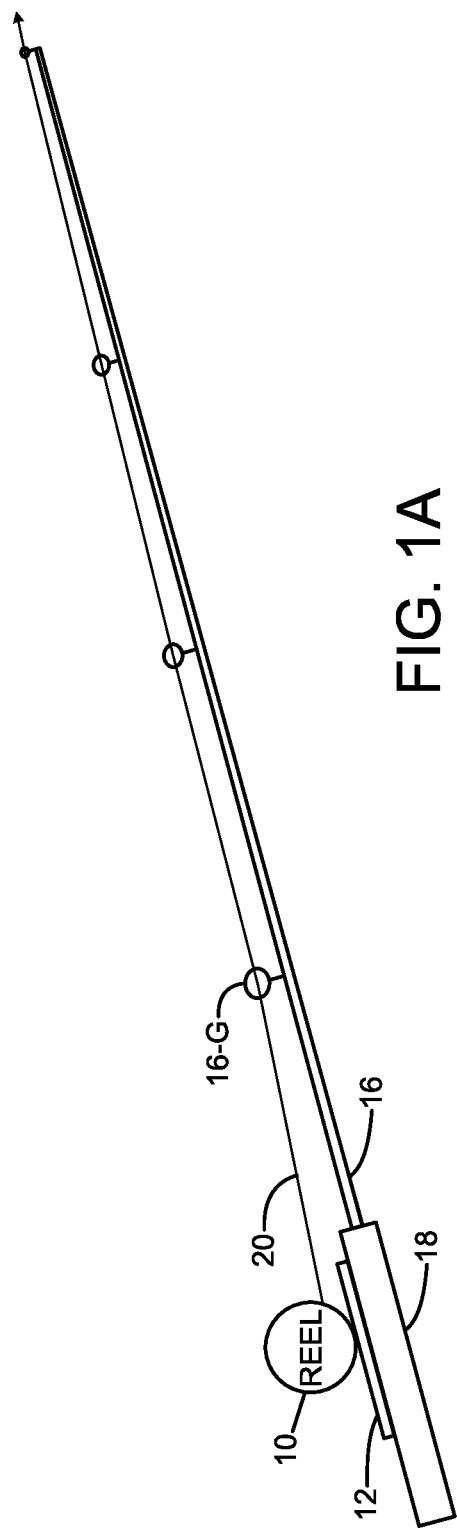

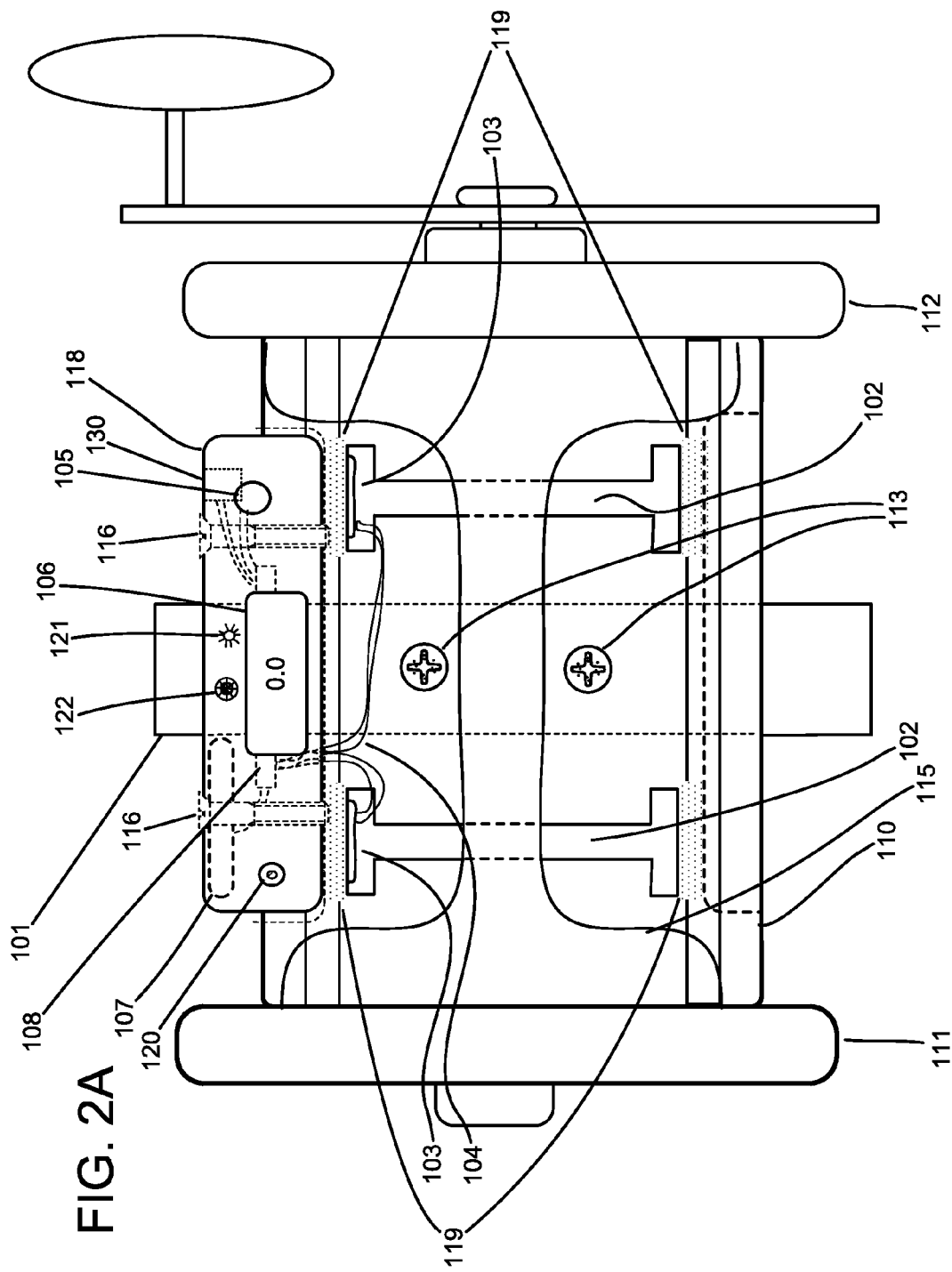

Reel With Position Compensation Flow Chart

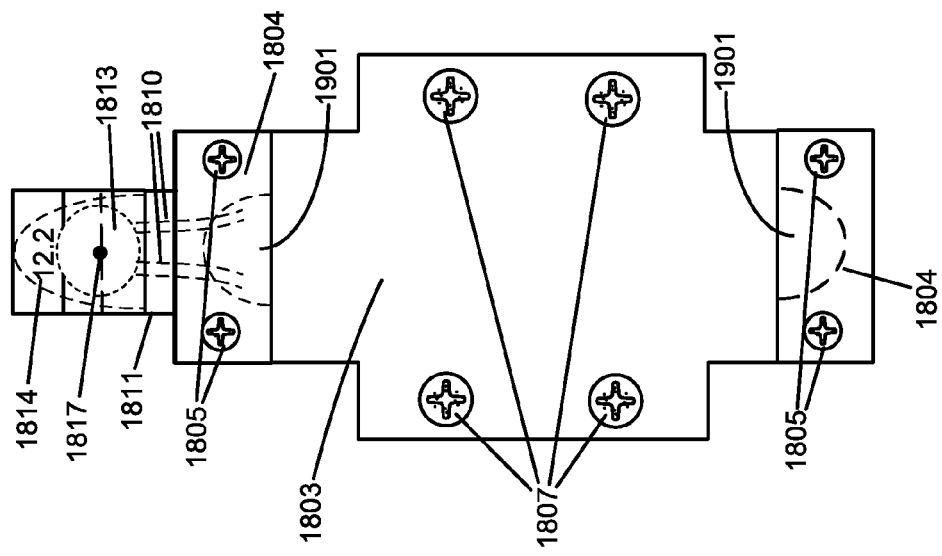
FIG. 19B Top Reel Mount Plate
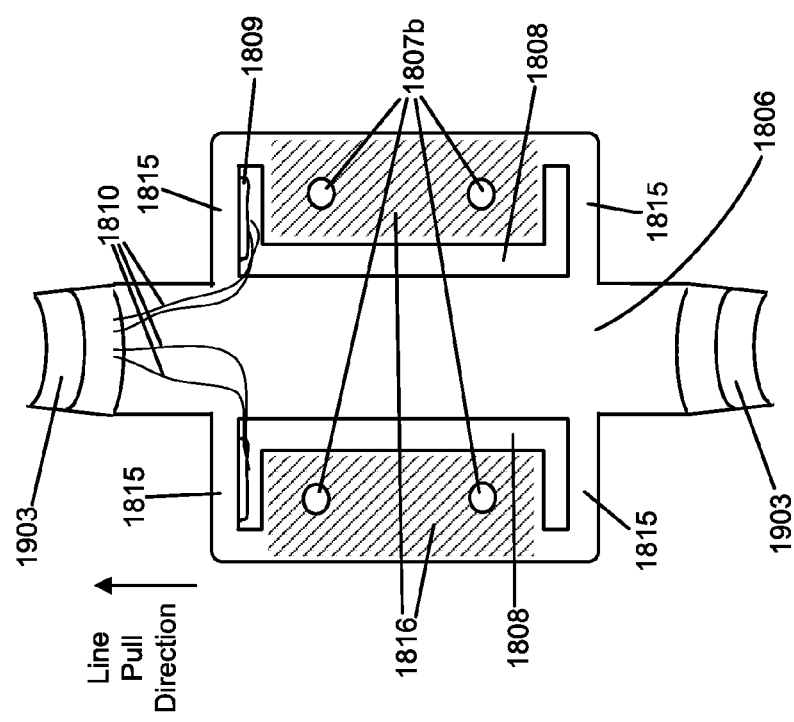
FIG. 19A Base

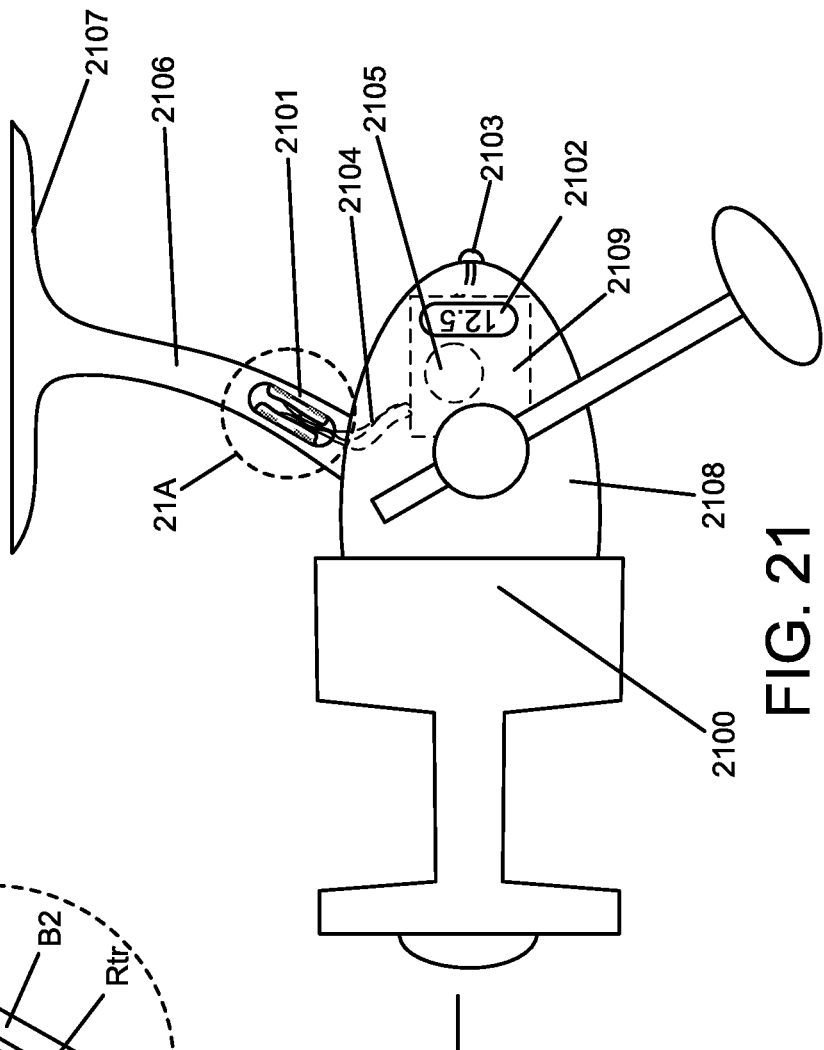
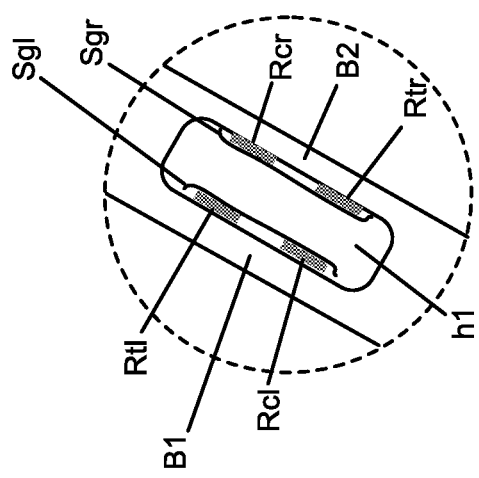
FIG. 21A
FIG. 21

US 8,839,547 B2

REEL SYSTEM WITH LINE TENSION MEASUREMENT CAPABILITY

CROSS-REFERENCE TO RELATED APPLICATIONS

This application is a continuation-in-part of U.S. application Ser. No. 12/052,733 filed Mar. 21, 2008, and of U.S. application Ser. No. 11/977,714, filed Oct. 24, 2007, in turn a continuation-in-part of application Ser. No. 11/307,840, filed Feb. 24, 2006, now U.S. Pat. No. 7,318,295, the entire contents of which applications are hereby incorporated by reference.

BACKGROUND

The subject matter has application to fishing and more particularly to the design of fishing reels and electronic fishing equipment, as well as to other applications involving spools of cable or lines.

BRIEF DESCRIPTION OF THE DRAWINGS

Features and advantages of the disclosure will readily be appreciated by persons skilled in the art from the following detailed description when read in conjunction with the drawing wherein:

FIG. 1A is a diagrammatic view of a fishing rod and reel, illustrating an exemplary application environment.

FIG. 2A is a top view of an exemplary embodiment of a fishing reel embodiment of the spool frame with line tension measurement capability.

FIG. 19A is a top view of an exemplary embodiment of a measurement base of a reel support stage embodiment. FIG. 19B is a top view of a mount plate for use with the measurement base of FIG. 19A.

FIG. 21 is a side view of an exemplary embodiment of a line tension measurement system embodied in a spinning reel.

DETAILED DESCRIPTION

Figure 1B:
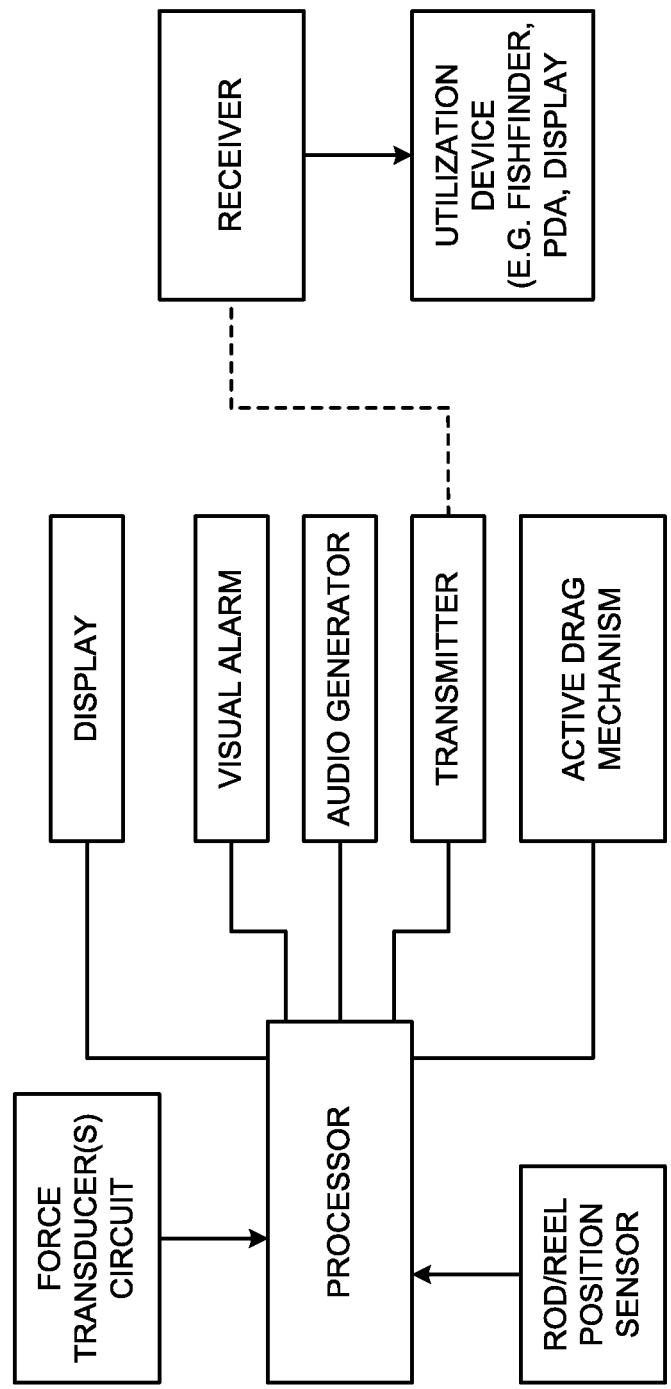
FIG. 1B is a schematic block diagram illustrating a line tension measurement system.

In the following detailed description and in the several figures of the drawing, like elements are identified with like reference numerals. The figures may not be to scale, and relative feature sizes may be exaggerated for illustrative purposes.

An exemplary embodiment of a fishing reel system is described. The exemplary embodiment includes a reel support structure, which includes a reel frame for supporting a line spool with a spool rotation axis, the line spool configured to wind fishing line entering the reel from a first direction. The reel support structure also includes a reel foot structure adapted for mounting to a fishing rod, wherein the reel foot is mechanically coupled to the frame. A force measurement device is configured to produce an electronic response signal indicative of a line tension force exerted on the line spool. The force measurement device in an exemplary form measures a flexing of, or strain within, the reel system in response to the force.

FIG. 1 diagrammatically illustrates a fishing reel 10 and reel mount 12 for attaching the reel to a rod handle 18 of a fishing rod 16. The reel holds a supply of line 20, passed through the line guides 16-G of the rod to a fishing lure or hook (not shown). FIG. 1B depicts a block diagram of an exemplary embodiment of a line tension measure system for measuring the tension in the line, which includes a processor which receives signals from a force transducer circuit and a rod/reel position sensor to calculate and display an indication of the line tension on a display. An audio transducer may also be employed to provide an audio signal indicative of the line tension, and/or a warning about the line tension. A visual alarm system may also be employed to indicate the line tension exceeded a threshold set by the user. The processor may also control an active drag mechanism, to control the reel drag applied to the line. The results of the line tension measurements may also be transmitted to a receiver unit, typically located remotely relative to the reel. The receiver unit may provide signals indicative of the line tension measurement and processor output signals to a utilization device, e.g. a PDA, a fish finder, a data recorder/processor or remote display.

An exemplary embodiment is a reel frame configured to hold and contain a spool of line, hose or other material, and that includes a force measurement system designed to measure the tension on the line, hose, or other material as it is pulled from the spool. The force measurement system may contain position sensors configured to compensate for the effects of gravity in the measurement, resulting in a more accurate measurement of the true force on the line, hose or other material, irrespective of the position of the spool and frame relative to vertical. In an exemplary embodiment, the system may be adapted to transmit force measurement data to a receiver for further processing, analysis, display, or recording. The system may be configured to process line tension measurement data to control the spool brake or clutch or drag so that a specified line tension threshold is not exceeded.

In one exemplary embodiment, a fishing reel frame incorporates a force measurement device, configured to produce a signal indicative of a bending, flexing or strain within, a beam structure of the reel as a result of the fishing line being pulled from the reel. The reel frame in this exemplary embodiment includes a positional sensing device, and an integrated electronics package adapted to convert the signal into a line tension measurement and display the fishing line tension generated by a fish pulling on the fishing line. Knowing the line tension can be important to the fisherman for a number of reasons. Knowledge of the line tension can be used by the fisherman to ensure that the drag, or the braking force presented by the reel, is set correctly. If the drag is set too tight, the fishing line will break when a large fish bites. If the drag is set too light, it will take much longer to land the fish and the threat of losing the fish is much greater.

Figure 12A:
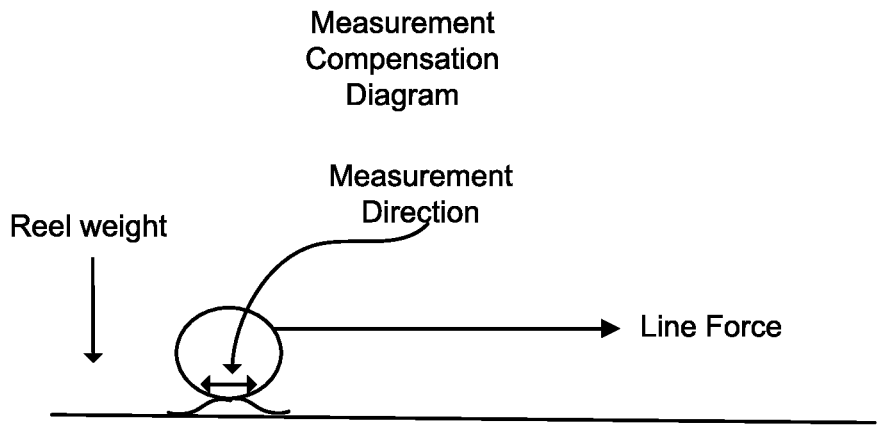
FIG. 12 is a diagram graphically depicting the reel weight component of an exemplary line tension measurement.
Figure 12B:
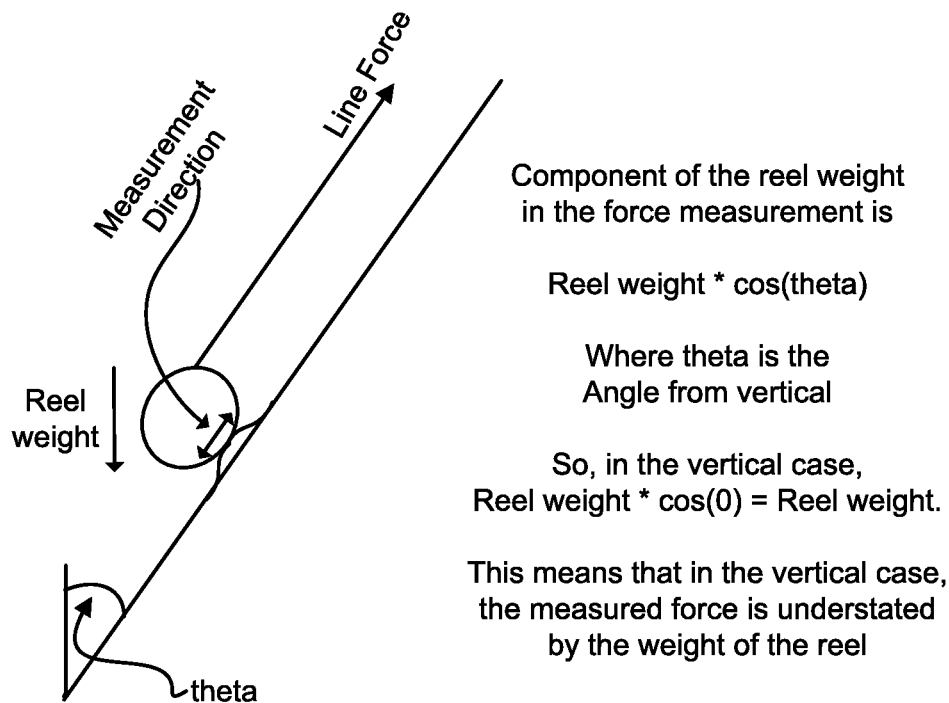
Figure 13:
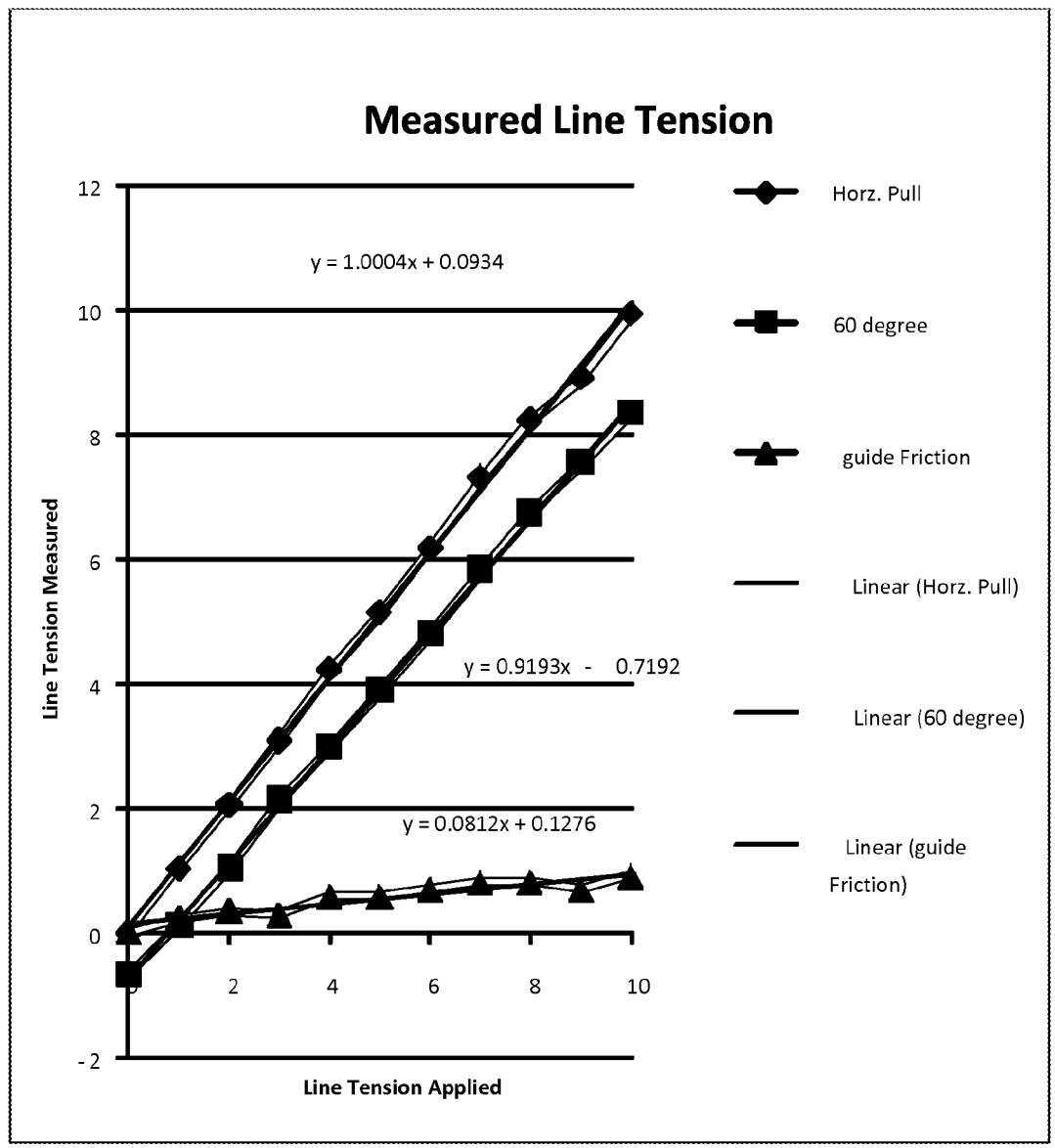
FIG. 13 is a graph showing exemplary line tension measurement data from a rod horizontal pull and rod at 45 degree pull, with rod guide friction also displayed on the graph.

Another embodiment of a measurement system incorporated in a fishing reel, reel seat, or reel support stage may include a position compensation function. When fighting a fish, the angler typically may raise and lower his rod as he brings the fish in. Often the angler will raise the rod to vertical and then reel in as he lowers the rod to nearly horizontal. Tension measurement systems integrated into the reel seat, reel or frame without positional compensation may misreport the line tension, as the weight of the reel may significantly influence the measurement. As shown in FIGS. 12 and 13, when the rod is in the vertical position, weight of the reel effectively reduces or compensates the line tension measurement reading by the weight of the reel due to the gravity. In the horizontal position, there is no reel weight causing an error in the line tension measurement.

In an exemplary embodiment, the line tension measurement error due to the rod position and the weight of the reel is compensated so that an accurate line tension measurement may be displayed. The weight of the reel may be a significant contributor to the line tension measurement in an uncompensated system. A typical reel may weigh 2 pounds. If the fish is pulling with a force of 5 pounds, the line tension reading with the rod in the horizontal position would be 5 pounds, but, in the vertical position, the reading would only be 3 pounds since the weight of the reel pulling downwards would be offsetting the force of the line, pulling upwards. Measurement data in FIG. 13 illustrates the effects of the reel weight in measured data and a graphic representation is shown in FIGS. 12A and 12B.

In an exemplary embodiment, a line compensation system or algorithm routine may account for both reel weight and rod guide friction. Any measurement system incorporated into the reel seat or reel may be influenced by the friction created as the fishing line slides over the line guides when the rod is bent. Line guide friction can account for an under reporting error by as much as 8 percent or so of the actual line tension.

Tension measurement compensation for spool frame position has applications in other areas as well. It can readily be seen that this technology would be applicable for cranes or hoists for example. If the cable spool on the crane or hoist is mounted to a moveable arm, the weight of the cable spool can be compensated in order to generate an accurate cable tension reading.

In an exemplary embodiment, a fishing reel system may be provided with a radio frequency (RF) transmitter (FIG. 1B) capable of periodically or continuously transmitting the current line tension. A receiver (FIG. 1B) is configured to receive the transmitted line tension data and to process the data in one or more of a variety of fashions. In one example, a graphic display of line tension as a function of time in a strip chart would be very useful to detect line tension changes. This could be plotted on a fish-finder thereby allowing the angler to detect any changes is line tension. Any change in line tension is of interest to the angler. In another embodiment, the receiver is configured to store line tension data and information received from the fishing reel transmitter for later analysis and processing. And in another embodiment, the receiver is configured to process line tension information in real time to actively control the fishing reel drag.

Transmitting the line tension data from a fishing reel allows the angler to monitor his rod/reel remotely. Often times the angler will be at the helm or in the cabin while trolling. The fishing line tension may change for a variety of reasons. A fish may hit the bait or lure increasing the line tension. Line tension may also increase if the lure or bait becomes fouled with seaweed or kelp and having a fouled lure greatly reduces the chance of catching fish. Basically, the angler is interested in anything that changes the fishing line tension while trolling. The embodiment where the line tension is transmitted and displayed remotely allows the angler to know when there is a change in line tension whether he is at the rod, in the cabin, or at the helm.

An exemplary embodiment of the fishing reel with line tension transmitter enables the integration of fishing line tension information into other fishing equipment. For example, the receiver could be connected to or integrated into a fish-finder, enabling the fish finder to display all pertinent electronically available fishing information (sonar fish return, water temp, and fishing line tensions) on a single screen. This is useful information for the angler and having the information displayed on a single piece of equipment would be very advantageous.

While trolling the fisherman may be at the helm of the boat or in the cabin rather than next to his rod(s). When a fish of sufficient strength and weight strikes the lure, the reel "clicker" makes a noise alerting the fisherman. In other instances, kelp or debris may attach to or foul the lure. In this case, the line tension increase due to fouling may be insufficient to exceed the reel drag so that no clicker noise alerts the fisherman to this situation even though the line tension as increased. Trolling while dragging kelp or debris on a lure greatly reduces the likelihood of catching a target fish and the angler wants to know when kelp or debris has been picked up on the lure.

It is well known that some fish fight harder than others. This embodiment allows the calculation of a new fishing metric, the "power" of the fish. A receiver in the preferred embodiment may be configured to mathematically integrate the line tension over the time it takes to catch a fish thereby calculating the actual power the fish exerted while being caught. Fishing tournaments could add a new category based on this new metric where the most powerful fish wins. Also, since many fishing tournaments support releasing fish, a supporting power metric could be added or required for catch and release tournaments.

An exemplary embodiment enables the potential identification of fish prior to its being caught. It is well known by those skilled in the art that fishermen can feel the "fin beat" as it is transferred from the fish through the line to the fishing rod. The fin beat frequency can be detected by feel by an accomplished fisherman. While fish are fighting against a line, their locomotion is primarily derived from oscillating thrust of their caudal or tail fin and one can feel that oscillation thrust or fin beat through the line. Studies have shown that the frequency that the fish modulates its tail fin is related to its size as well as its species. By transforming the line tension data from the time domain into the frequency domain by processing a Fourier transform or equivalent, the fishing system receiver can calculate the fundamental beat frequency of a fighting fish. A database of fish species and their typical fin beat rate could be searched and the result presented to the fisherman as the most likely fish at the end of the fisherman's line. Identification of the fish species is important to some fishermen. Tournament fishing may value only certain species of fish. The ability to identify those species prior to landing the fish enables the fisherman to release or cut off unwanted species, thereby maximizing the time spent focusing on the target species.

An exemplary embodiment enables the angler to record and save the line tension data during the time he fights the fish. The receiver may contain a data storage medium which stores the line tension data over time. This record line tension data can be replayed on the receiver or transferred to other devices such as a personal computer, to be analyzed after the fight.

An exemplary embodiment of a fishing reel system works actively to help the fisherman land his fish. In this embodiment, the system actively controls the reel drag which controls the maximum line tension presented by the reel through a servo feedback loop to prevent fishing line breakage resulting from the reel applying too much drag force. It is a fact that as the fishing line comes off the spool, the diameter of the spool containing the fishing line decreases. The drag force presented by a conventional fishing reel on the fishing line is directly related to the spool diameter. As the diameter of the spool decreases, the drag increases proportionately so, as the fish pulls line off the reel, the drag increases, sometimes to the point of breaking the line.

This preferred embodiment uses a servo loop to actively control and limit the drag applied by the reel. In the preferred embodiment, the user first sets his drag in the normal fashion. After setting the drag, the fisherman presses a "set drag" button on the receiver or reel to store the current "set" position of the drag mechanism and current "set" position of the drag actuator. He then pulls the line off the reel against the drag in the direction from the reel towards the tip of the rod. This allows the line tension measuring device to measure and store the maximum line tension presented by the drag as the maximum target line tension for the servo loop. After storing the target maximum line tension the servo loop is activated to actively control the fishing reel drag.

In active mode the servo loop reads the current line tension from the line tension measuring device and, if the current line tension exceeds the stored target line tension, the drag actuator is commanded to reduce the drag until the measured line tension is at or below the stored maximum target line tension. If the measured line tension is less than the stored target line tension and the drag actuator had previously been commanded by the servo control loop to reduce the drag and the drag actuator is currently backed off from the "set" position, the drag actuator will be commanded to increase the its position back to its "set" position thereby returning the drag mechanism and reel drag back to it's original "set" position. The active drag mechanism of the fishing system will help prevent loosing fish due to increased reel drag due to reduced line spool diameter. This is an innovative, non-intuitive, feature of the preferred embodiment.

As electronics make their way into reels, the reels may require significant power. Batteries internal to the reel are one solution but these are limited in size and power. Another solution is to locate the batteries or other power source outside of the reel. This solution requires an electrical connection between the reel and the battery. External wires are not a good solution since they may be easily snagged and broken in the fishing environment. To solve this issue, in an exemplary embodiment, a reel-seat, reel-based electrical connector may be employed. Those familiar with angling are familiar with how a reel is traditionally connected to the rod. The reel has a reel foot section that mates into a reel foot receiving portion on a reel seat. A rotating compression nut and sliding hood locks the reel foot and reel solidly onto the reel seat and rod. In the reel-seat, reel-base electrical connector, the reel seat has spring loaded electrical contacts configured to make contact with matting electrical contacts in the reel foot. This, for example allows a battery holder to be fashioned into the base section of the fishing rod and wires to be run under the handle to the reel seat. No wires would be exposed or in danger of snagging. Connecting a reel with the mating reel foot with electrical contacts will bring battery power into the electronics in the reel. The electrical contacts in the reel-seat and reel foot are designed to be protected from the elements to avoid corrosion. Dielectric grease may be used on the contacts to further protect them from corrosion.

Accordingly, an exemplary embodiment is a fishing reel with a force sensing device coupled to an electronics package encased in an environmentally protective housing designed to convert the signal from the force sensing device to quantitative units of pounds or kilograms. The force sensing device may include, in an exemplary embodiment, one or more strain gauges mounted on the reel frame or reel foot. The electronics package may optionally include a position sensor, e.g. an accelerometer, for sensing the position of the reel in relation to the horizon, and a central processing unit (CPU) configured to compensate for the weight of the reel, thereby reporting an accurate applied force to the reel, e.g. where the applied force is the force of the fishing line pulling on the reel. The electronics package may also optionally include a transmitter capable of transmitted a signal containing the measured line tension to a receiver. The transmitter technology may vary significantly between embodiments. Suitable transmitter technologies include, but are not limited to, radio frequency (RF), infrared (IR), audible, or simple electrical signals through hard wiring. In an exemplary embodiment, the fishing reel with line tension measuring device and transmitter measure the fishing line tension continuously or periodically, and broadcast that information, e.g. periodically. A receiver configured to receive and process the signal broadcast from the transmitter converts the signal back into line tension information for display, processing, or storage.

In an exemplary embodiment, the electronics package includes a microprocessor (the CPU), an analog to digital converter (ADC), an accelerometer, an amplifier, a LCD display, a RF transmitter and various discreet components. The strain gages mounted on the frame are wired to the electronics package and configured in a Wheatstone bridge circuit. The output from the Wheatstone bridge is amplified and measured using the ADC.

In an operational mode, the microprocessor reads the outputs from the ADC of the accelerometer, e.g., in the case of a 3-axis accelerometer, X, Y and Z axis data, and the Wheatstone bridge ADC. The angle of the rod is calculated based on the accelerometer ADC readings and the vertical and horizontal accelerometer ADC readings that were acquired and stored when the system was initialized. The weight of the reel may be calculated and stored as well when the system was initialized. To generate an accurate line tension measurement the measured force is adjusted for the weight of the reel. The formula for line tension is:

line tension=ADC measured tension+cos($A$)*reel weight where A is the rod angle from vertical. The ADC measured tension is calculated based on the Wheatstone bridge ADC readings. In an exemplary embodiment, there is a direct relationship between the Wheatstone bridge output and force applied. The reel weight component is cos(rod angle)*reel weight.

A simple example will illustrate the reel weight compensation. Suppose the reel weighs 2 pounds. If the rod is held horizontal and a force of 5 pounds is pulled on the fishing line in the direction towards the rod tip, the force measured from Wheatstone bridge ADC reading will represent 5 pounds since there is no reel weight component. The force of gravity is normal to the measurement plane which, in this case, is horizontal. The cosine of 90 degrees is 0, so 5+(2*cos(90))=5. If the rod is rotated to the vertical position and the 5 pound line tension is still applied, the Wheatstone bridge ADC reading will represent only 3 pounds. The line pull is still 5 pounds but the measured force from the Wheatstone bridge is only 3 pounds since the weight of the reel is exerting a downward gravitational force of 2 pounds against the upward force of 5 pounds. Thus, the ADC measured force is 3 pounds but the angle adjusted force is 5 pounds (3+(2*cos(0))=5).

Figure 2B:
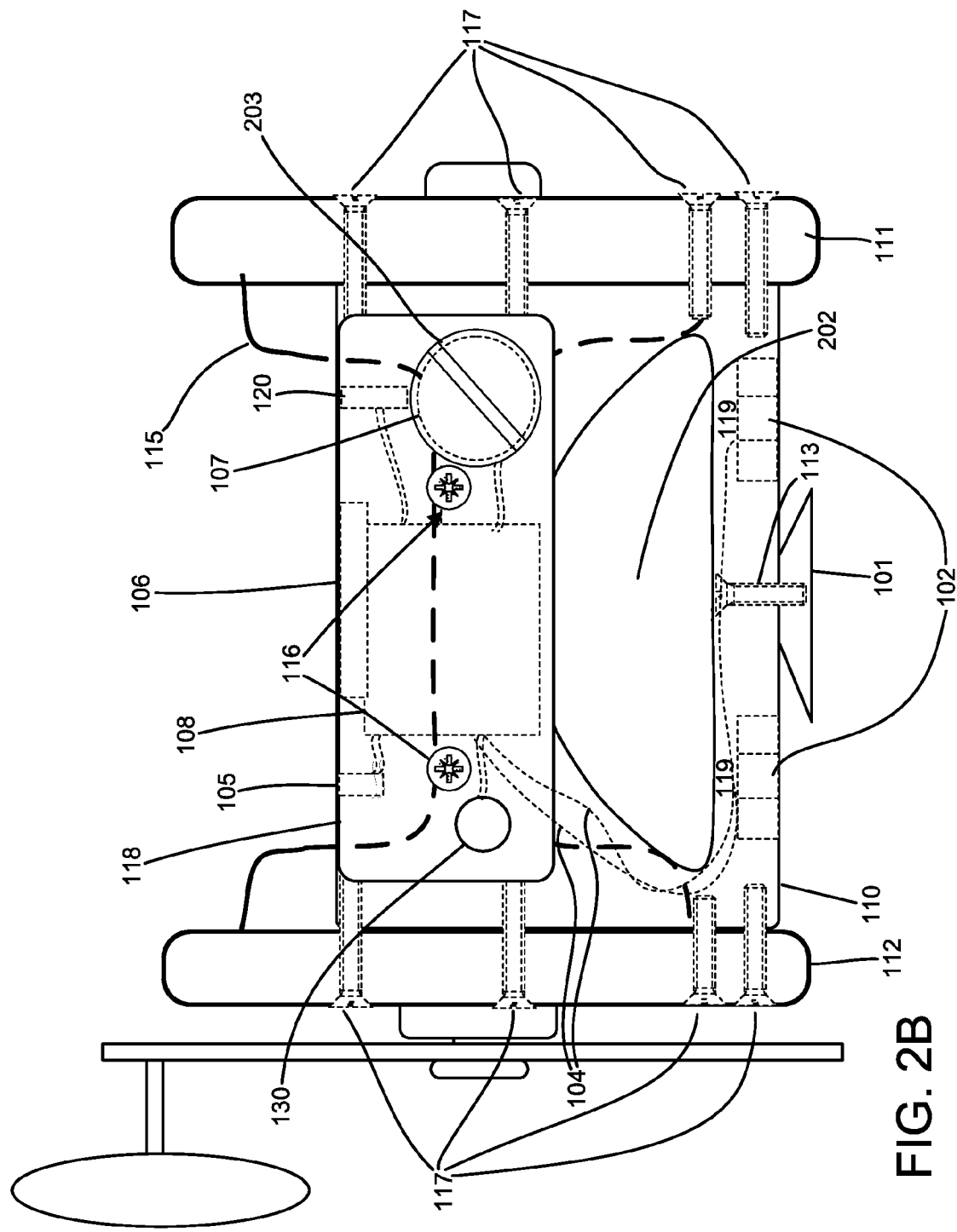
FIG. 2B is a front view of the embodiment of FIG. 2A, illustrating internal components.

FIG. 2A is a top diagrammatic view showing an exemplary embodiment of a reel spool frame (110) with line tension measuring capability as embodied in a fishing reel. Attached to the left and right side support sections (110A, 110B, FIG. 4) of the frame (110) are the right and left side plates or side support structures, 112 and 111 respectively. As is common in the art, the side plates are connected to the frame with screws (117, FIG. 2B). The fishing spool (115) is contained between the two side plates. Attached to the bottom of the frame by machine screws (113) is the reel foot (101). The reel foot is used to securely attach the reel to the rod in a device known as a reel seat.

Attached to the front of the frame is the electronics package or module (118). The electronics package contains a battery (107), switches (105, 130), electronics board (108), data jack or port (120), warning light (121), audible warning buzzer (122) and LCD display (106). Strain gages (103) are bonded to a section of the frame and wired to the electronics board (108). Slots (102) are formed, e.g. by milling, into the bottom of the reel frame base (110) parallel to the reel foot (101), creating four support beams (119) which have been shaded for clarity. In this embodiment, these beams (119) are the only supporting members connecting the reel foot (101) section (114, FIG. 4) of the frame (110) to the left and right side support sections (110A, 110B) of the frame (110) and to the side plates and spool. Thus, when an external force is applied the spool, for example as when line is pulled, strain will be generated in the beams (119). The strain will be roughly proportional to the external force applied, i.e. the strain will increase/decrease with increase/decrease of applied external force. The strain gages (103) will change resistance due to the changing strain in the beams (119). The change in resistance of the strain gages will be amplified through a Wheatstone bridge circuit on the electronics board (108). The CPU will measure the voltage change associated with the resistance change via its analog to digital converter (ADC) and, based on calibration values stored in the CPU's static memory, convert the ADC reading to a force in pounds or kilograms to be displayed on the LCD display (106) or transmitted to a receiver.

FIG. 2B shows a frontal view of the embodiment of FIG. 2A. The front view is defined as if the reel was mounted on a rod and the viewer is looking from the tip of the rod towards the butt of the rod. This view shows the side plates, 111 and 112, attached to the frame with screws (117). It also shows the cut-outs (202) in the frame that both lighten the frame and create the beams (119) for the strain gage devices. The cut-outs are on both the front and rear section of the reel frame so there is an opening completely through the frame. The electronics package (118) is attached to the frame with machine screws 116. Gaskets, not shown, protect the internals of the electronics package from the harsh marine environment. Inside the electronics package is the On/Off switch (105), the Set Target drag switch (130), electronics board (108), LCD (106), data jack (120), and battery (107). The warning light and buzzer have been omitted for clarity. This frontal view shows the battery access plate (207) which can unscrew to provide access to the battery (107). Once again, a gasket may be used to ensure that no water enters the electronics package through the battery access plate.

Figure 3:
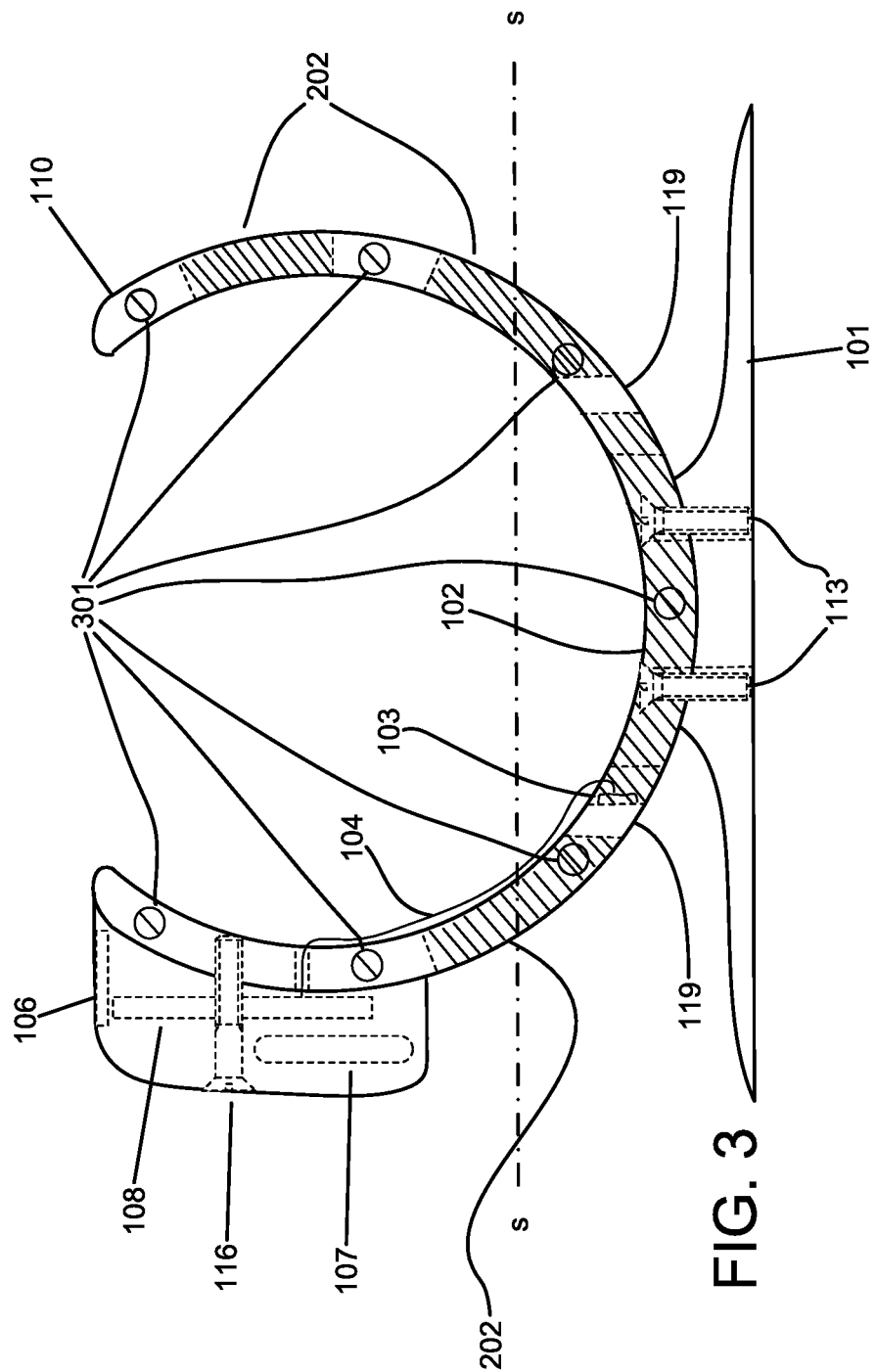
FIG. 3 is a side view of the embodiment of FIG. 2A, without side plates attached.

FIG. 3 shows a side view of the frame (110). The shaded portions indicate cutout or relieved areas in the frame. This view shows the beams (119), created by the cut-out (202) and the milled I-channel (102). Strain gages (103) are applied to the beams and wired to the electronics package (108) with wires (104).

Figure 4:
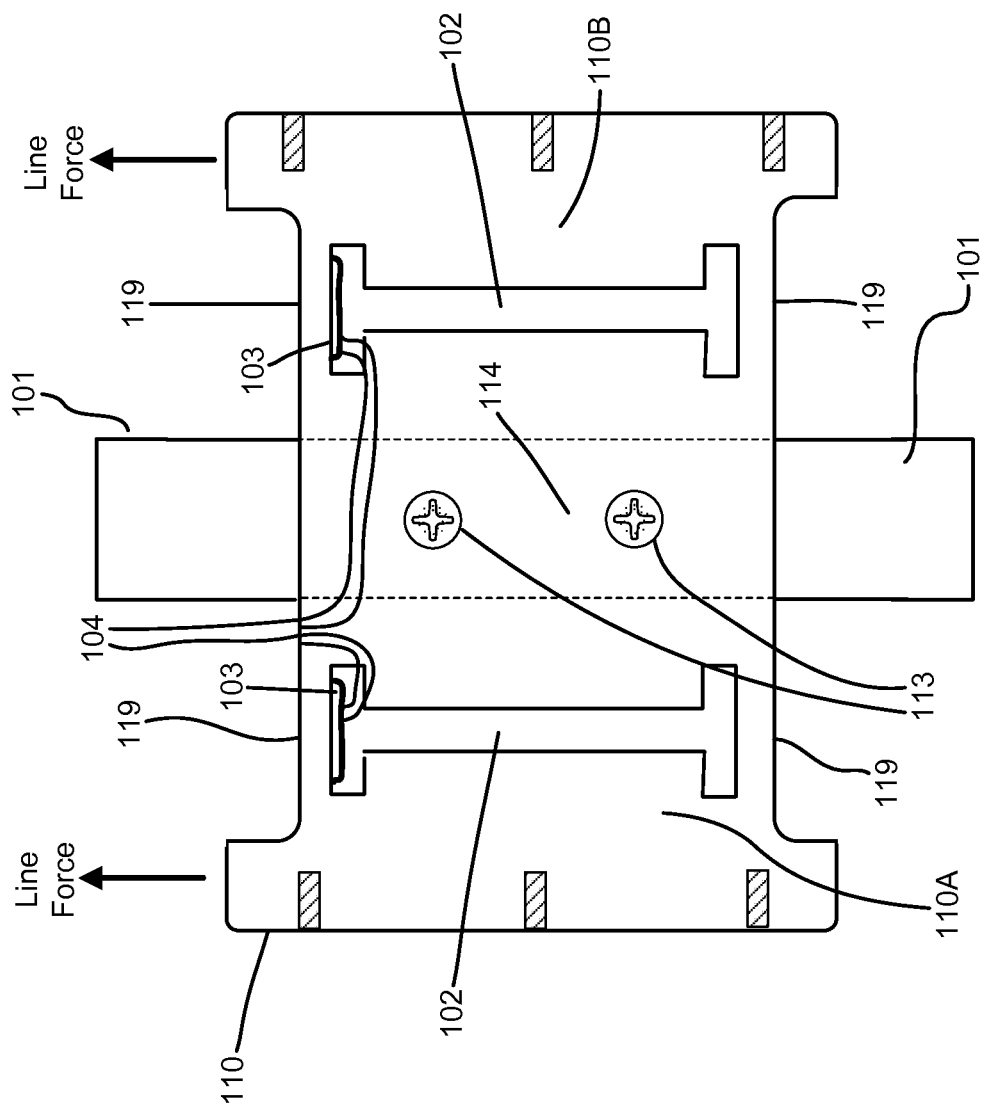
FIG. 4 is a section view of the embodiment of FIG. 2A, illustrating an exemplary strain gage measurement embodiment, taken through line S-S of FIG. 3.

FIG. 4 is a top diagrammatic view of the bottom portion of the frame as if the frame were sliced horizontally along line s-s in FIG. 3. This view shows beams 119, defined by the milled I slots (102) and the edge of the cut-outs (202). This view is also illustrative of how the strain will be introduced into the beams. The reel foot (101) will be firmly affixed to the reel-seat which is part of the rod. Any pull on the line which is on the spool which is held between the side plates will create a strain in beams 119. The Line Force arrows indicate the direction of the force when the line is being pulled from the spool against the drag of the reel. In normal fishing configuration, the line will be pulled along the axis of the reel foot (101) since the line goes from the reel through the line guides which are on the rod. Thus, the line force vector is from the reel to the first guide on the rod. As force is applied in the direction of the Line Force arrows, strain is induced in the beams 119. The strain is proportional to the amount of force. The strain in beams 119 cause a resistance change in the strain gages (103) which cause the Wheatstone bridge to become unbalanced, thereby generating a measurable voltage. This voltage is measured and converted to a quantitative value, pounds or kilograms by the electronics package (108).

In another embodiment, the reel frame having an integrated line tension measurement system may be designed as a replacement reel frame in a fishing reel, so that the user uses it to replace an existing conventional reel frame.

Figure 5:
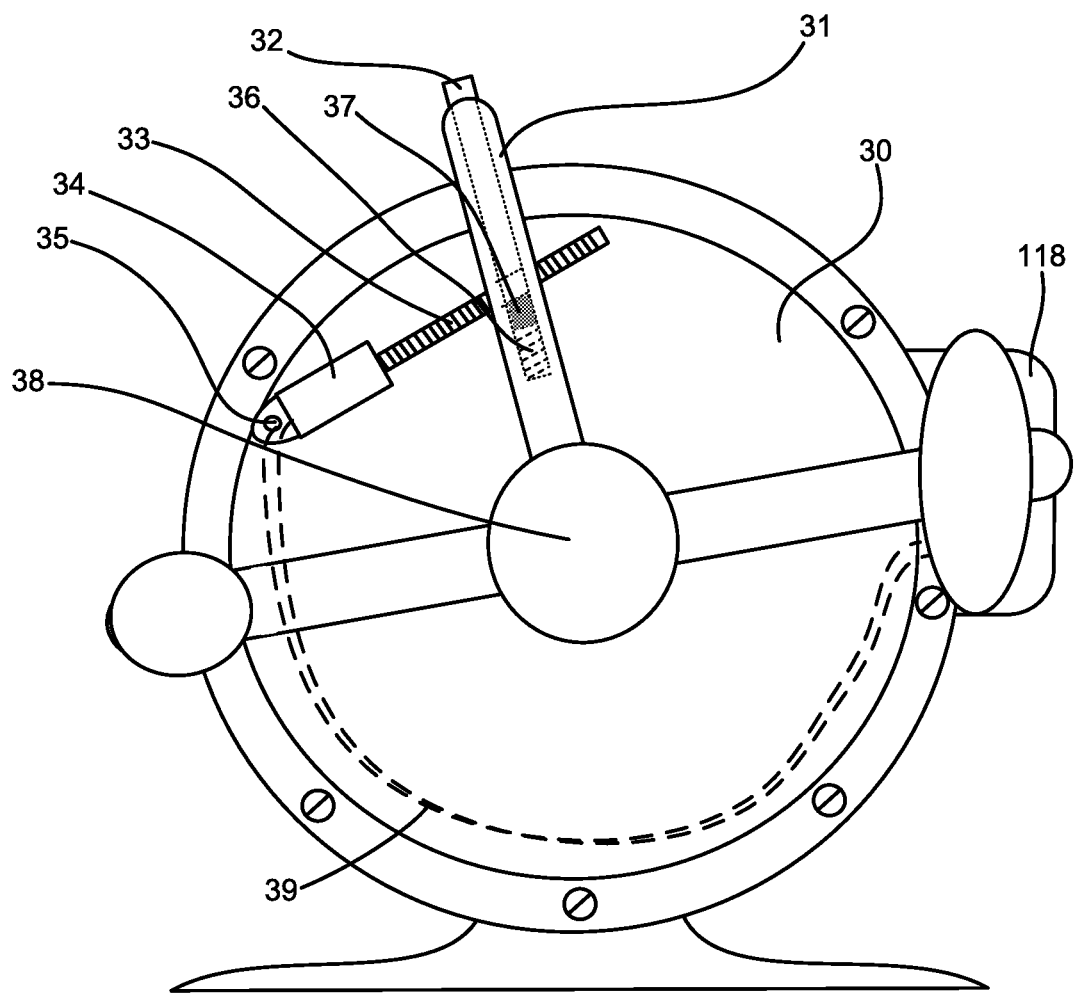
FIG. 5 is a detailed view of an exemplary embodiment of an active drag control mechanism.

FIG. 5 is a perspective view detailing an exemplary embodiment of a fishing reel (30) with an active drag adjustment mechanism. This embodiment is integrated into a lever drag style reel which is common in the market today. The lever drag (31) is used to manually adjust the drag. In this embodiment, depressing the button (32) on the top of the lever drag acts like a clutch and disengages the internal thread capture mechanism (37) which is normally engaged by internal spring (36). Depressing the button (32) disengages the thread capture (37) and the lever drag works exactly like a standard lever drag, i.e. moving it towards the tip of the rod (when the reel is installed on the rod) increases the drag, and moving it back, towards the butt of the rod, decreases the drag. After the fisherman sets his drag to the desired setting, he releases the button (32) which engages the thread capture mechanism (37) to the drive screw (33). In the engaged mode, if the electric motor (34) rotates the drive screw (33), the engaged thread capture mechanism (37) will adjust the lever drag forward or backward depending upon the direction of rotation of the motor (34). The motor (34) is mounted on a shaft (35) so that it can pivot as the angle between lever (31) and drive shaft (33) changes.

The drag lever (31) typically rotates around the center of the reel (38), creating a variable angle between the drag lever and drive shaft depending upon the position of the lever.

In active feedback mode, the motor (34) is controlled by the servo control loop in the electronics module (118). The motor (34) is connected to the electronics module via wiring (39). The electronics module has a servo control loop using the line tension measurement and target line tension as input and motor (34) position as output.

Figure 9:
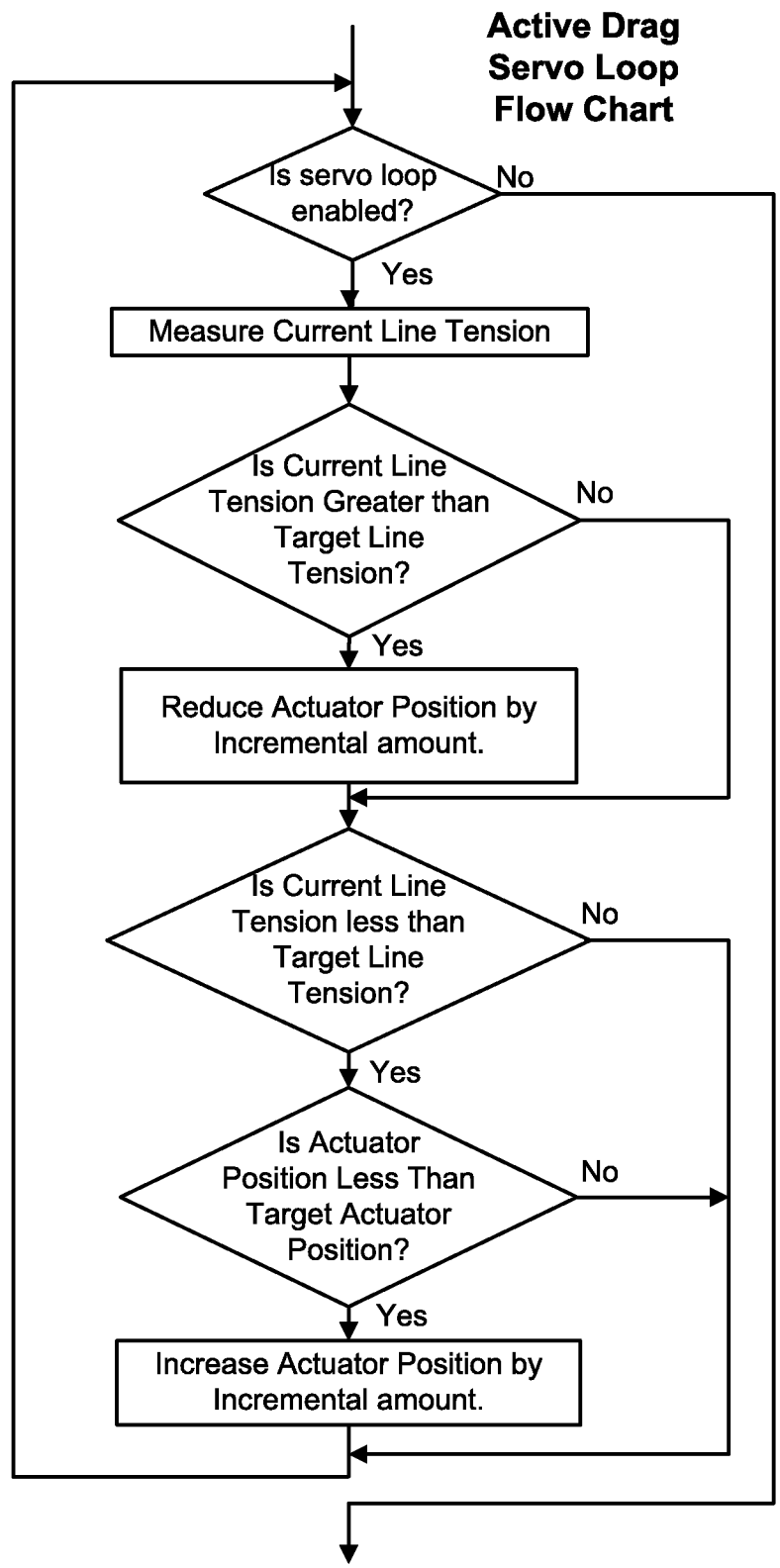
FIG. 9 is a flow chart illustrating an exemplary embodiment of logic for an active drag servo loop.
Figure 10:
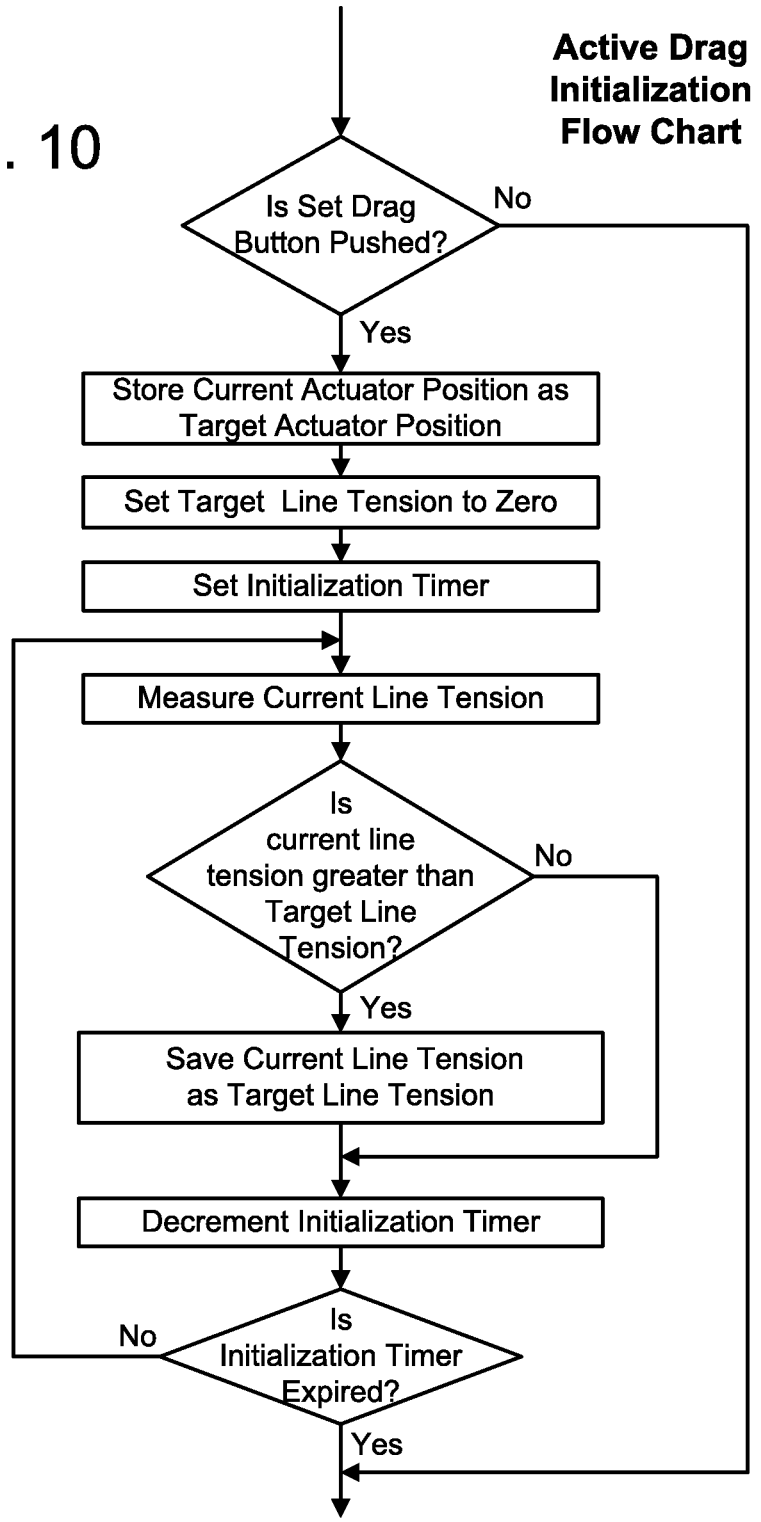
FIG. 10 is a flow chart illustrating an exemplary embodiment of logic for an active drag initialization sequence.

When the fisherman sets the drag he desires using the lever, he then sets the target drag force on the electronics module by pressing the Set Drag button (130, FIG. 2) and then pulls the fishing line off the reel against the reel drag in the direction from the reel to the tip of the rod. This allows the maximum line tension allowed by the drag setting to be measured by the line tension measuring device and the electronics module stores this maximum line tension presented by the reel drag as the maximum target line tension. The target position of the actuator motor is stored at this time too. Thus the drag servo system acquires the target motor position and target drag tension to be allowed in active mode after the Set Drag button (12) is pushed. After a preset amount of time (10 seconds), the system shifts to active mode and enters the servo control loop. In active mode the servo control loop actively controls the reel drag mechanism by activating motor (34) which turns the threaded shaft (33) which applies a linear force to the thread capture block (37) which moves drag lever (31). The servo control loop commands the motor (34) to prevent the reel drag from creating line tensions in excess of the target drag tension. Power is applied to the activating motor through wires (39) from the electronics module (118) on the reel. The electronics package is further illustrated in FIG. 2. An exemplary flow chart for the servo system is shown in FIGS. 9 and 10. Note, while this example shows the reel containing both the line tension measurement system and the active drag control system, other embodiments could support the active drag control system outside of the reel, for example in a RF receiver using the line tension transmitted via RF as the input to the servo control loop.

Figure 6:
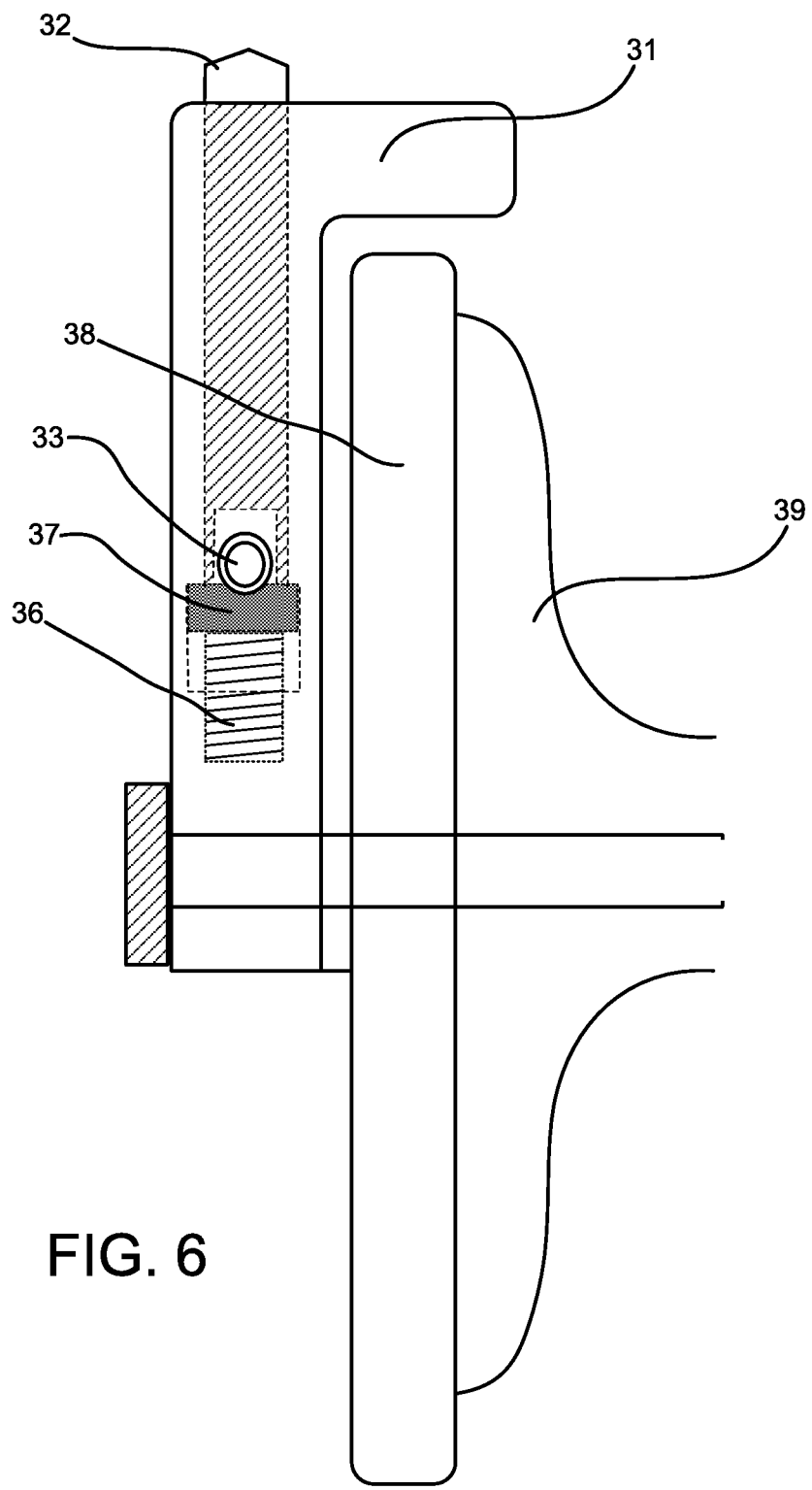
FIG. 6 is an exploded view of the active drag control mechanism of FIG. 5.

FIG. 6 shows a diagrammatic view of the reel side plate (38), reel spool (39), lever drag (31) and clutch mechanism (32, 36, 37). When the release button (32) on the top of the lever drag (31) is depressed, it pushes the thread capture (37) down against the spring (36) compressing the spring and releasing the thread capture (37) from the threaded shaft (33). This allows the fisherman to adjust the lever drag (31) freely with the thread capture mechanism disengaged.

Figure 7:
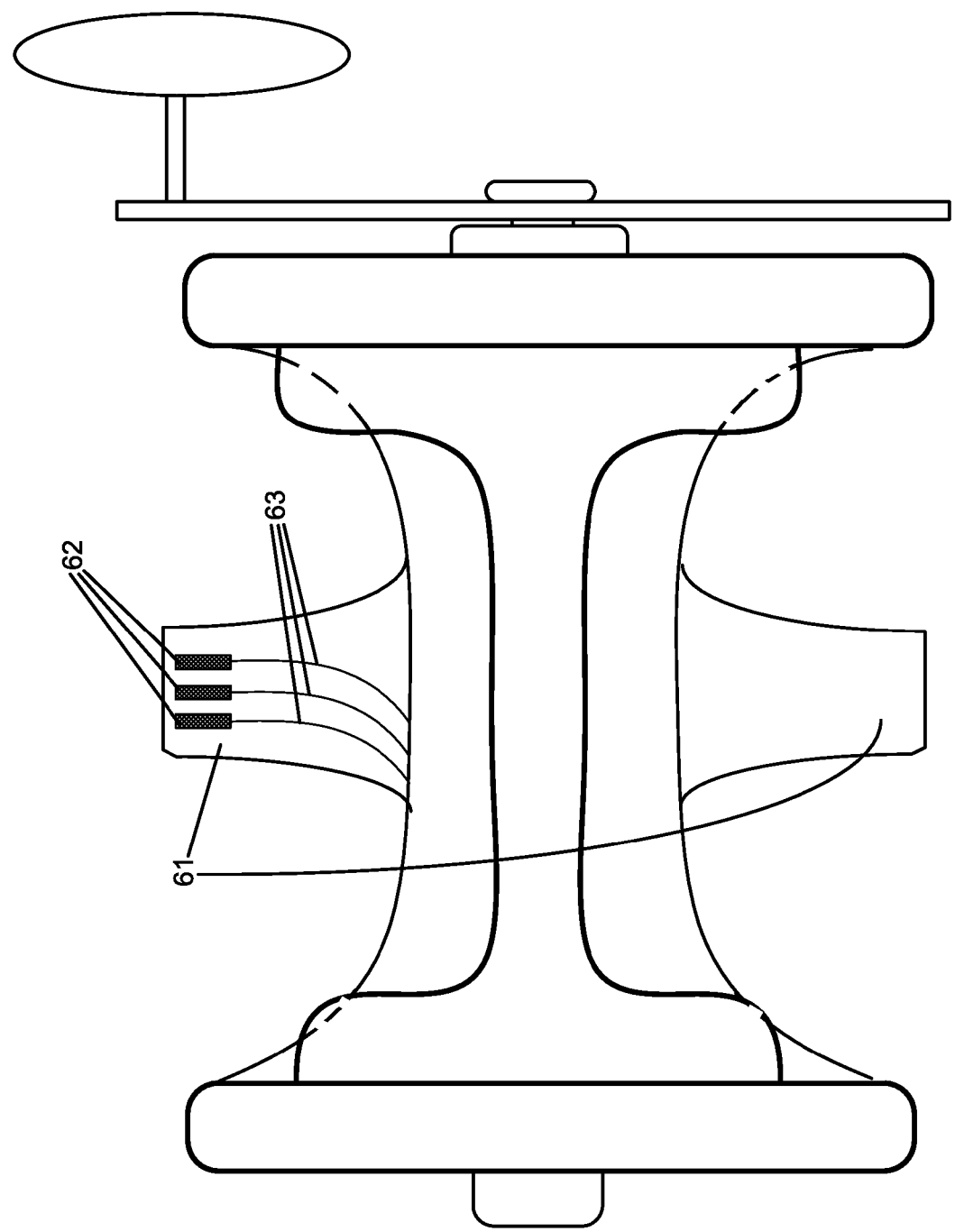
FIG. 7 is a top view of a reel embodiment illustrating an exemplary electrical connection embedded on the reel mounting foot.

FIG. 7 is a top view of an exemplary embodiment of a reel mounting tongue with electrical connections embedded on the surface of the mounting foot. As is common in the industry, the mounting tongue (61) mates with a receiver portion on the reel seat to secure the reel. The reel tongue of an exemplary embodiment has insulated gold contact pads (62) on the surface of the tongue and wires (63) connecting the contact pads to the reel servo motor (34, FIG. 5) or other electronics such as electronics module (118, FIG. 5). An exemplary embodiment of the reel seat has mating electrical connections internal to the mating receiver section designed to establish an electrical connection between the reel seat and the reel.

Figure 8A:
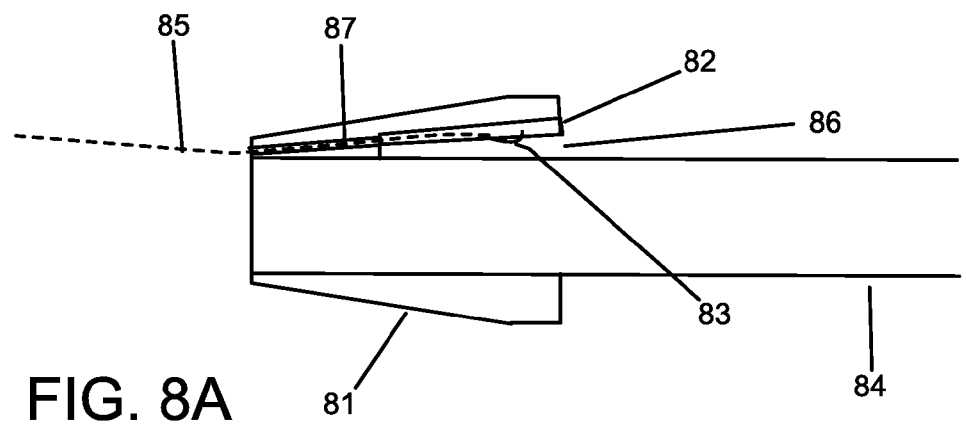
FIG. 8 is a perspective view and section view of a reel seat with electrical mating connection for the reel mounting foot with embedded electrical connections of FIG. 7.
Figure 8B:
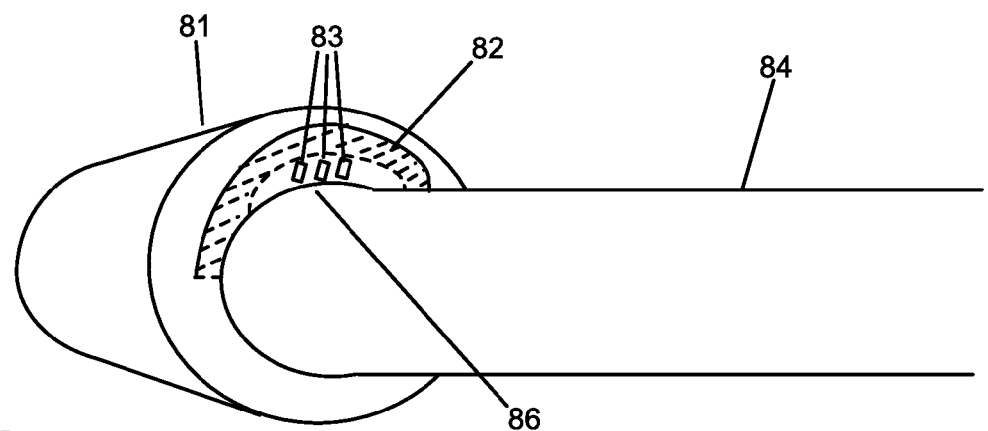

FIG. 8 is a side cut through view of an exemplary embodiment of the forward mounting section of a reel seat with electrical connections. The aft section is omitted in this view for clarity. The aft section may be as common in the art, and includes a capture hood and thread advanced locking nut for securing the reel tongue into the forward mating section (81). The electrical contact springs (83) are deployed in a plastic, electrically non-conductive carrier (82). The carrier is curved and shaped to fit snugly into the recess in the receiving hood. The receiving hood has a small hole (87) drilled from the recess to the front of the hood to allow the wires (85) to exit the hood and be fed to their proper destination. The destination may be batteries or any other monitoring equipment. The contacts may provide power to the electronics module only, and/or may also allow the data to be accessed through the contacts. The electrical contacts (83) are positioned to match the contacts (62, FIG. 7) on the reel tongue. Positioning can be tightly controlled by specifying the shape and taper of both the reel tongue (61, FIG. 7) and receiving opening (86). Di-electric grease can be used in the electrical mating area to prevent corrosion and improve electrical contact.

FIGS. 9 and 10 are flow diagrams illustrating an exemplary embodiment of the drag servo system initialization mode and operating mode. The servo loop starts by reading the current line tension (CLT). If the CLT exceeds the target tension, the actuator motor (34, FIG. 5) is driven an incremental amount in the direction to pull the drag lever back, thereby decreasing the drag tension by an incremental amount. If the CLT is less than the target tension AND the actuator motor is back off from the target position, the actuator motor is driven an incremental mount in the direction to push the drag lever forward, thereby increasing the drag tension by an incremental amount. Control returns to the start of the servo control loop.

FIG. 10 is a flow diagram illustrating an exemplary embodiment of the drag servo initialization sequence. The operator will press the "Set Drag" button (130, FIG. 2) on the line tension monitoring electronics module to start the sequence. The electronics module will then store the position of the drag lever. The system will then measure and store the maximum line tension for a set amount of time (until the initialization timer expires), on the order of 5-10 seconds. During this time, the angler will pull line off the reel, against the set drag, in the direction towards the tip of the rod, in order to generate the target drag force. Thus, at the completion of the initialization sequence, the system has recorded both the target maximum drag force and the target actuator position. These are the control parameters for the active drag servo loop described in FIG. 9.

Figure 11:
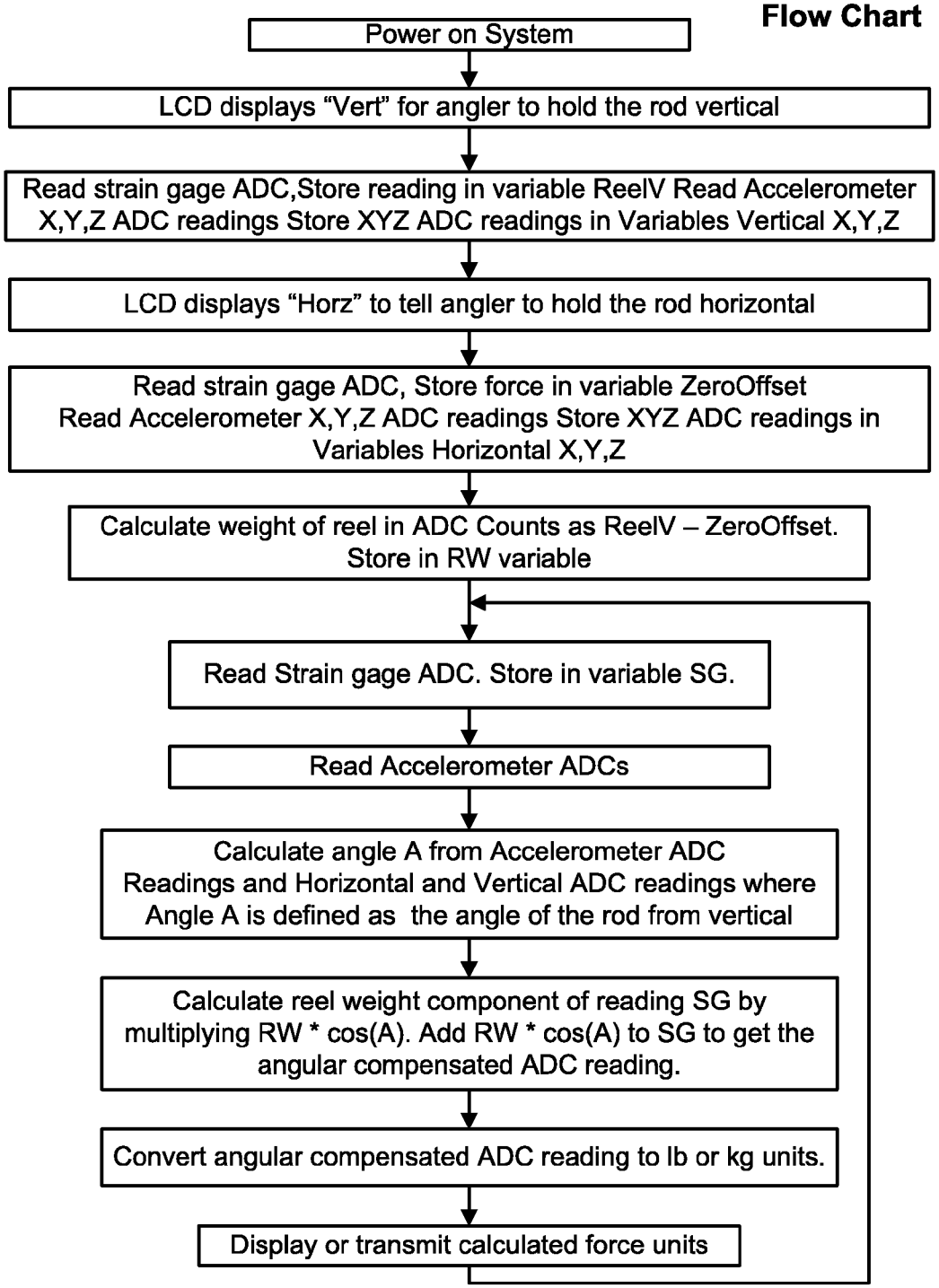
FIG. 11 is a flow chart illustrating exemplary logic for an exemplary embodiment of a reel with position compensation.

FIG. 11 shows an exemplary flow chart illustrating an exemplary embodiment of an initialization and operation sequence for a reel with line tension measurement capability with positional compensation. With current accelerometer technology, the system is initialized to a known position. This is vertical in the present embodiment. When the angler first powers the system on, the rod is held vertically for a few seconds in order for the system to store the vertical accelerometer ADC readings and to measure the weight of the reel. After the vertical readings have been taken, the LCD (106, FIG. 2A) will be flashed to signal the angler to rotate the rod to the horizontal position. The horizontal accelerometer and force readings will be taken and stored. The system initialization is then complete and the system enters operational mode in an exemplary embodiment, where it continuously measures the output from the Wheatstone bridge and accelerometers, and calculates, displays, and broadcasts the calculated line tension.

FIG. 12 graphically describes why positional or angle compensation provides a more accurate line tension measurement.

FIG. 13 shows a plot of actual test data from an exemplary system reel frame line tension measurement system. This data is the uncompensated line tension readings. Viewing the uncompensated data, the effects of reel weight and guide friction can be readily seen. The test setup is an exemplary reel frame with the herein described sensors and measurement electronics installed. The reel was mounted on a rod with 6 traditional line guides, and weighs 1.4 pounds. In the horizontal testing configuration, the rod is clamped in a horizontal position and heavy fishing line is fed through the rod guides. A calibrated load cell is attached to the end of the line and a pulling force is applied with a pulling mechanism in 1 pound increments from 0 to 10 pounds. At each increment, the load cell reading is recorded and the uncompensated reel frame line tension measurement is recorded. This is repeated 5 times, the 5 samples are then averaged, and the resulting averaged data is plotted. This data is the top line on the graph. A linear fit on the data was done and the resulting equation is $$y=1.004x+0.0934$$

Next, the rod was clamped at an angle of 60 degrees and 5 repetitions of 0-10 pounds pull were acquired and averaged. The 60 degree pull data is plotted on the same chart. A linear fit on the 60 degree data was done and the resulting equation is $$y=0.9193x-0.7192$$

A comparison of the horizontal pull and 60 degree pull clearly shows the effects of reel weight and guide friction. As mentioned, the reel weight was 1.4 pounds. Per the reel weight compensation equation, reel weight contribution=cosine(angle)*reel weight, a 0.7 pound error is expected due to the rod at 60 degrees (1.4*cos(60)=0.7). The 60 degree data at 0 pounds pull is offset by −0.7192, the y offset in the linear fit equation. The reel weight contribution of the measurement is constant throughout the testing since the reel weight does not change and the angle of the rod does not change. If there were no guide friction, the horizontal plot and 60 degree plot would be offset by the reel weight but their slopes would remain the same. The data shows that as the applied line tension increases, the difference between the horizontal plot and the 60 degree plot increases. This increase in measured difference is attributed to friction from the line guides. The line guide friction component was calculated by adding the reel weight component to the 60 degree data and subtracting that reel weight compensated data from the horizontal pull data. The resulting guide friction data was plotted and the linear fit calculated. The guide friction linear equation is $$y=0.0812x+0.1276$$

This shows that there is an approximately 8% tension loss due to line friction over the guides in this controlled line tension measurement test. It also shows that compensation for guide friction may be an innovative, desirable feature for a line tension measurement system. An exemplary system to compensate for line guide friction may increase the measured line tension (after position compensation is applied) by the average loss due to line guide friction. In this case it is approximately 8%. This data was taken with standard (non-roller) guides. Roller guides have much less friction so the compensation factor is smaller, on the order of 3-4%. Thus, a system that compensates for both rod position and line guide friction would use an equation of the following form:

$$LT=(MF+(RW*cos(theta)))*(1.0+GFF)$$

Where LT is the displayed line tension, MF is the measured force, RW is the weight of the reel, theta is the angle of the rod to vertical, and GFF is the guide friction factor (0.08 in the example above).

Figure 14:
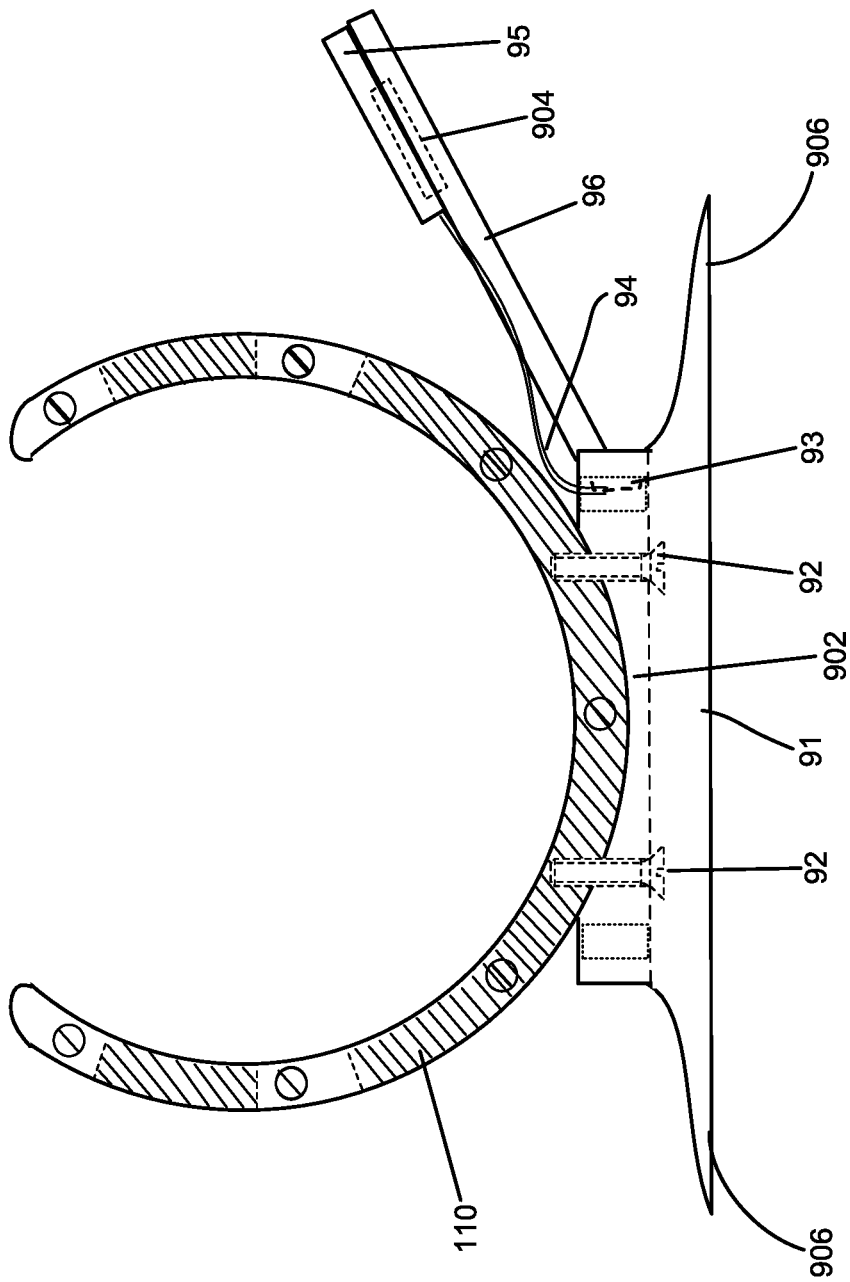
FIG. 14 is a cut through diagram of an exemplary embodiment of a reel foot with line tension measurement capability.

FIG. 14 is a cross sectional view showing an exemplary embodiment of the force measurement system integrated with a reel foot (91) rather than the reel frame (110). The reel foot is connected to the reel frame (110) with screws (92). This is common with a number of conventional reels today. The reel foot has an electronics support arm (96). The electronics module (95) and battery (904) are mounted on the electronics support arm (96) and connected to the strain gages (93) with wires (94). The electronics support arm allows the angler to view the LCD on the electronics package while holding the rod in the normal fashion.

Figure 15:
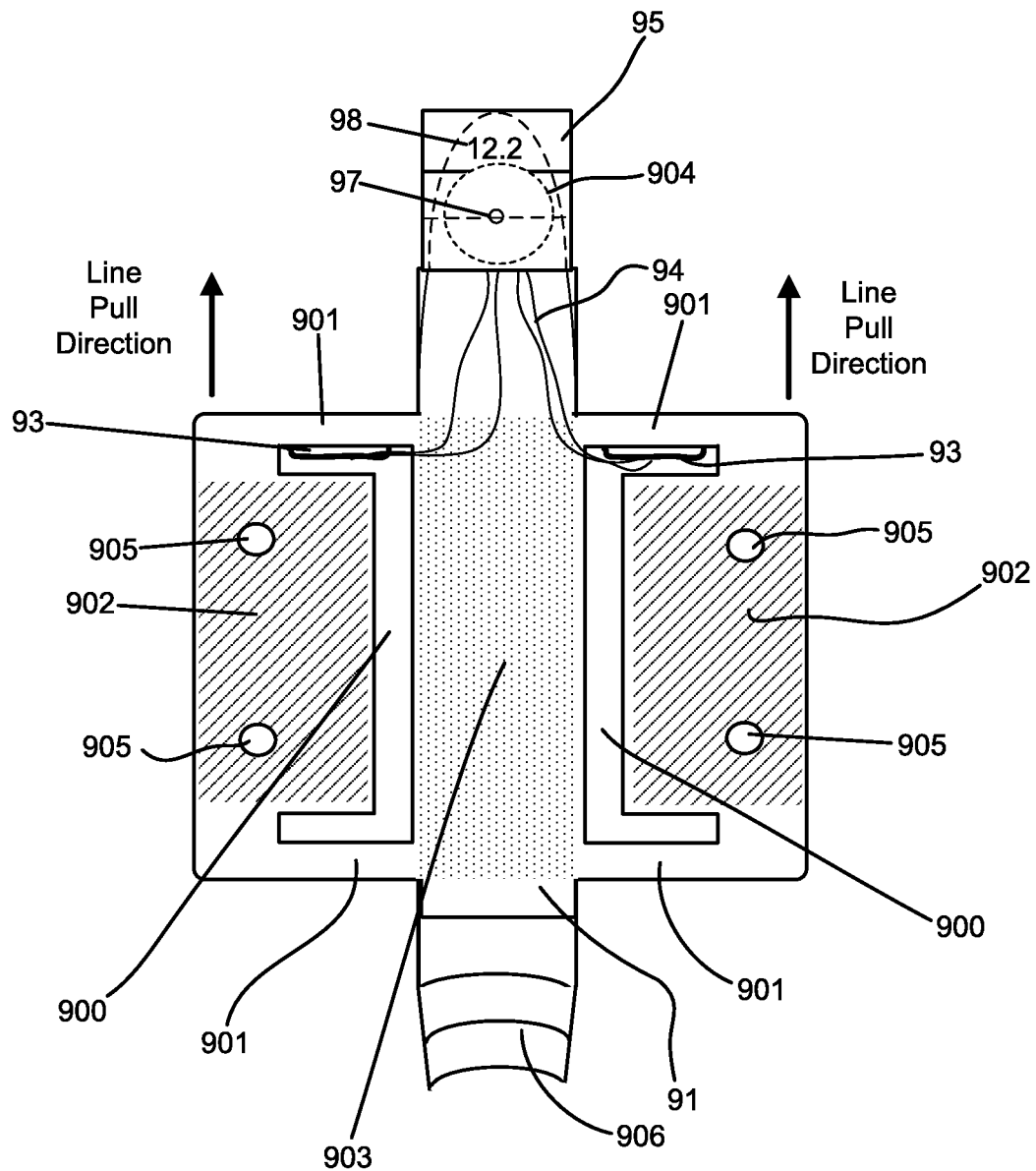
FIG. 15 is a top view of the reel foot embodiment of FIG. 14.

FIG. 15 is a top view of the removable reel foot (91) containing the line tension measurement system. Having the system embodied in a detachable reel foot allows for old or conventional reels to be retrofitted with this technology. The reel frame is attached to the reel foot with screws. The screws attach through holes (905). When the screws are tightened, the reel frame mates against the reel frame support surface (902) of the reel foot. This mating surface is shown as diagonal lines in FIG. 15. The center section (903) of the reel foot is recessed away from the frame. Channels (900) are fabricated, e.g. milled, into the reel foot. These channels extend all the way through the reel foot creating four support beams (901) that connect the reel frame support section (902) of the structure to the center section (903) of the reel foot, which is firmly attached to the fishing rod in the normal fashion by securing the tapered ends (906) of the reel foot in the reel seat section of the rod. This design supports the reel solely through support beams (901) since the frame is attached and mated to the reel foot on surfaces 902 and the center section (903) is recessed and not in contact with the reel frame. Therefore, when the reel foot is attached to the rod, all forces on the reel are being supported by the support beams (901). The direction of pull from a line on a fishing reel is indicated in FIG. 15 by "Line Pull Direction" arrows. When the center section of the reel foot is fixed on the rod, and the line on the reel is pulled, the force from the line pull will be transmitted into the support beams (901). The reel and connecting surfaces (902) will be pulled in the direction of Line Pull Direction in FIG. 15. Since the center section is fixed, a force will be applied to the beams (901) attempting to flex them in the direction of the line pull (see FIG. 20). Strain gages (93) are applied to the forward support beams and connected to the electronics (95) through wires (94). The strain gages will produce a response indicative of this flexing force which is related to the line tension force.

The electronics package (95) has an internal battery (904) and a power switch (97) and an LCD (98) to display a force indication based on the response of the strain gages. In an exemplary embodiment, the strain gages are configured into a Wheatstone bridge and the electronics package measures the signal from the Wheatstone bridge and converts to a force in pounds or kilograms and displays that force on the LCD.

Figure 16:
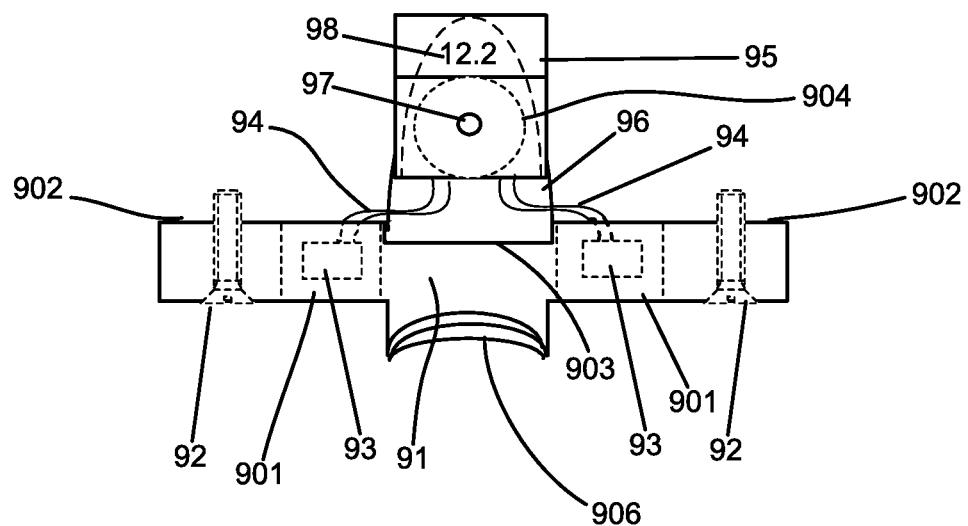
FIG. 16 is an end-on view of a reel foot embodiment as in FIG. 14.

FIG. 16 shows an end view of the reel foot looking along the axis of the rod mount section. This details the recessed section (903) showing it to be lower than the reel frame mount surfaces (902). Mounted on the support arms (901) are the strain gages (93), connected to the electronics package (95) by wiring (94). The electronics package is mounted on the electronics support arm (96) and includes a battery (904), switch (97) and LCD display (98).

Figure 17:
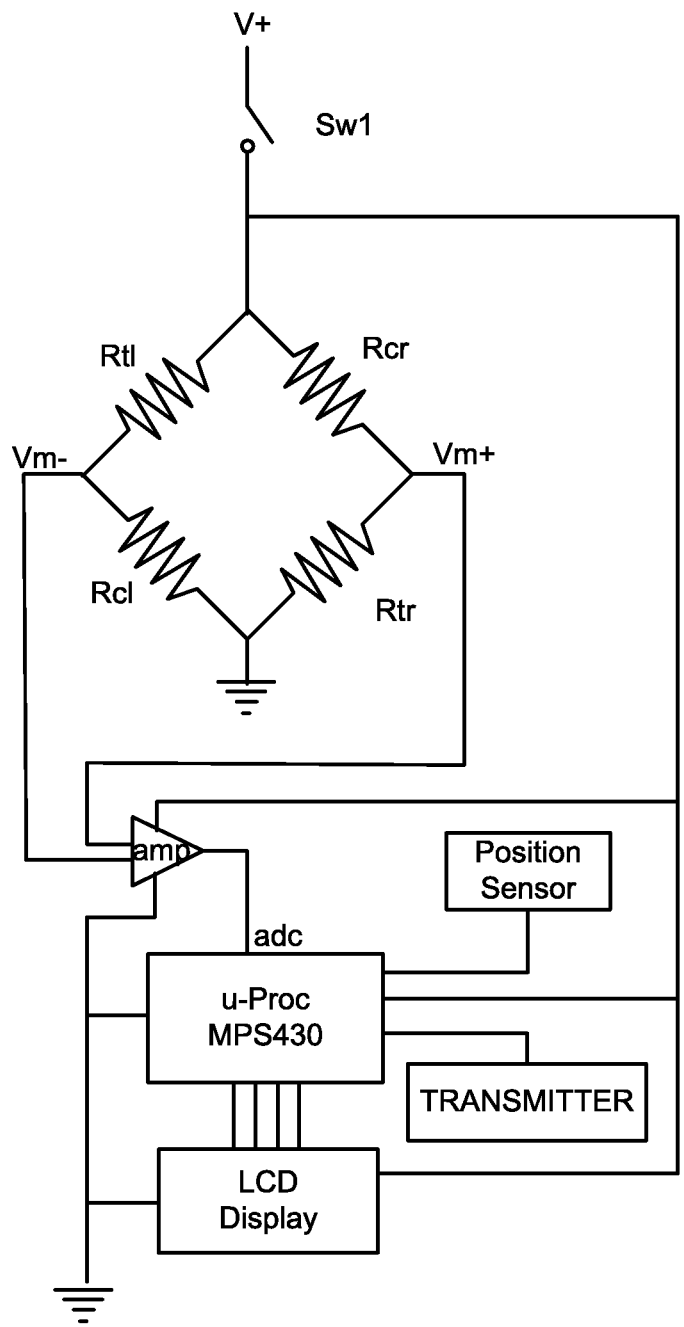
FIG. 17 is a circuit diagram of an exemplary embodiment of electronics for the system.

FIG. 17 is a circuit diagram showing functional components of an exemplary embodiment of the electrical circuit of the line tension measurement system. There are a number of non-intuitive design points embodied in this embodiment. The system includes a "full" Wheatstone bridge, i.e. each of the four legs of the bridge is a resistor from a mounted strain gage. The strain gage on each flexing arm is a dual gage, i.e. it actually has two gauges (resistors) on a single backing (see FIG. 20). Thus, the two flexing beams (119) on which a strain gauge is mounted, as in the embodiment illustrated in FIG. 4 and FIG. 20, for example, contain all four resistors of the Wheatstone bridge. A full bridge is much less susceptible to thermal drift than a half bridge. This particular implementation has the gage resistors from the left double gage (Rtl & Rcl) (Rtl=Resistor Tension Left, Rcl=Resistor Compression Left) configured on one side of the bridge and the right double gage resistors (Rtr & Rcr) configured on the other side of the bridge. By balancing the right and left double gage across the Wheatstone bridge as shown, the thermal effects common with strain gauge implementations are mitigated. In this embodiment, the right and left side of the reel frame or reel foot may heat independently. While fighting a fish, the side of the reel with the drag may heat more than the other. Since the double gage resistors are distributed evenly on each side of the Wheatstone bridge, this asymmetrical heating does not significantly affect the bridge output (Vm− and Vm+). The bridge output, which varies in response to the strain in the flexing arms, is amplified and measured by the analog to digital converter (ADC) in the micro-processor, a Texas Instruments MSP430 in this embodiment. The ADC reading is converted to a force in the micro-processor using a pre-programmed calibration, e.g. in values stored in a look-up table. As described previously, position compensation may be applied with input from position sensors. The calculated force is then displayed on the LCD and may be transmitted by the transmitter.

Figure 18:
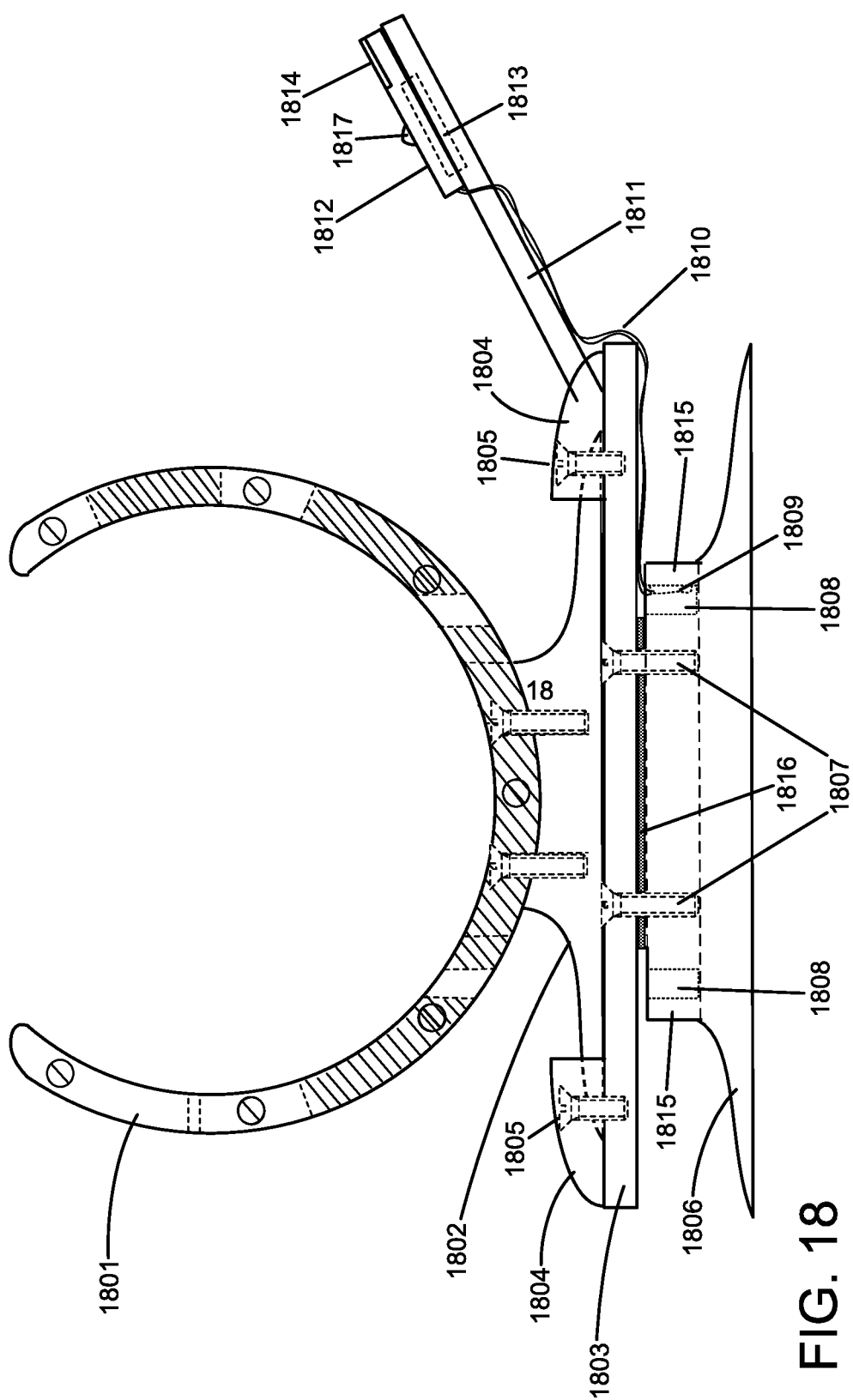
FIG. 18 is a cut through diagram of a reel support stage embodiment of the system.

FIG. 18 shows a cut-away view of an exemplary embodiment of a reel support stage with a line tension measurement system embedded in it. A reel support stage allows a reel (1801) to be mounted on a mounting plate (1803). The reel foot (1802) is captured in a clamp (1804) secured with screws (1805) to the mounting plate (1803). The mounting plate is attached to the measurement base (1806) with screws (1807). The measurement base (1806) is attached to a fishing rod in the standard fashion. Similar to the reel foot embodiment (FIGS. 14,15, 16) the mounting plate (1803) is attached to the measurement base (1806) at raised platform 1816. This allows force to be sensed in the four support beams 1815. The force is sensed by strain gages (1809). The strain gages are connected to the electronics module (1812) with wires (1810). The electronics package has a battery (1813), LCD display (1814) and switch (1817).

FIGS. 19A and 19B show respective top views of the measurement base (1806) and mounting plate (1803). The mounting plate is attached to the base with screws (1807) which connect to threaded holes in the base (1807b). The only contact between the mounting plate and base is the raised mounting surface (1816) which is highlighted with a diagonal line pattern in FIG. 19A. Since the mounting plate is affixed to a raised mounting surface, and the mounting surfaces are isolated from the rest of the base by the through-cut channels (1808), the mounting plate (and attached reel) is connected to the base only through the four support beams (1815). Thus, the external forces on the reel, such as the pull on the fishing line, are felt in the support beams. The strain gages (1809) are attached to the support beams and wired to the electronics package. The reel is attached to the mounting plate through two clamps (1804). The clamps have a shallow recess (1901) to allow the reel foot to slide under the clamp when the clamp screws (1805) are loosened. Tightening the clamp screws firmly attaches the reel to the mounting plate. The reel support stage has a tapered foot (1903) similar to a standard reel foot. It is designed to be secured to the fishing rod in the same manner that a standard reel is attached to the rod, typically in a reel seat with a compression clamp.

Figure 20:
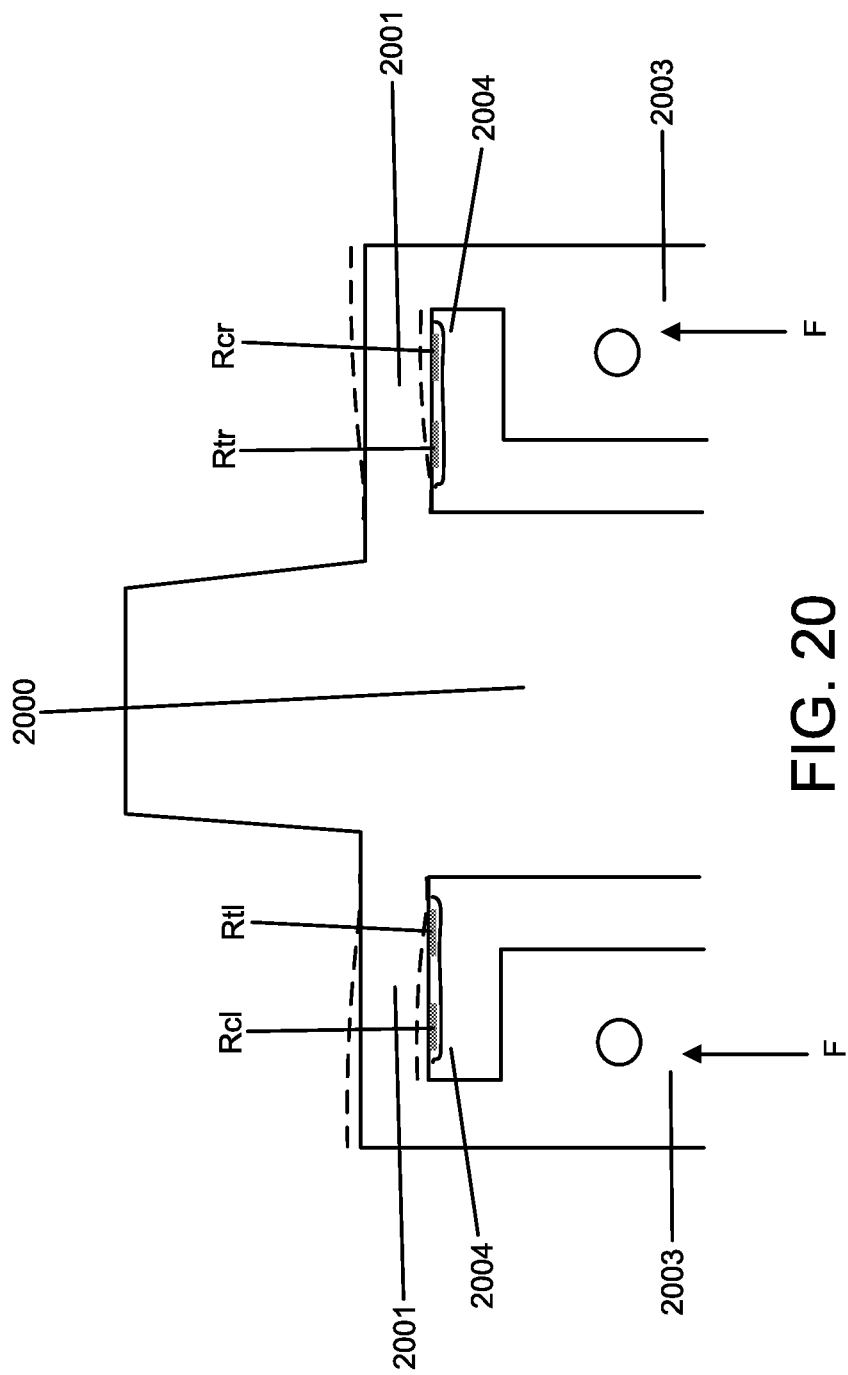
FIG. 20 is a detail of an exemplary embodiment of flex beams and dual strain gage placement.

FIG. 20 illustrates an exemplary embodiment of a flex beam configuration. The beam material could be metal, carbon fiber, or fiberglass, or possible other material that a strain gage could be applied to. Only the top half of the structure is shown in this detail. The bottom half is passive. The center rail (2000) of the reel, reel seat, or support stage is permanently affixed to the rod. The force from the fishing line is pulling the reel towards the tip of the rod. The arrows (F) show the direction of the force. If a very great force were applied, the beams would deform as shown in the dotted lines; however, in a typical fishing application, the forces are not that great and there is little noticeable movement of the beams. The dual strain gages are applied to the beams in order to sense the force F. Each of the dual strain gages actually has two strain gages configured in a single package. An exemplary embodiment of a dual strain gage suitable for this application is a Vishay dual grid model N2A-13-T028K-350. The 2 gages in the left carrier are labeled Rcl and Rtl for Resistor Compression Left (Rcl) and Resistor Tension Left (Rtl). Likewise, the two gages in the right carrier are labeled Rcr and Rtr for Resistor Compression Right (Rcr) and Resistor Tension Right (Rtr). The flex beams in this embodiment exhibit both tension and compression when a force (F) is applied to the structure. The gages closest to the fixed center rail (Rtl & Rtr) are in tension and the gages farthest from the center rail (Rcl & Rcr) are in compression. These four gage resistors are wired into a full Wheatstone bridge as shown and described in FIG. 17.

FIG. 21 illustrates another exemplary embodiment, in which a line tension measurement device is embodied in a spinning reel (2100). Spinning reels have an arm (2106) connecting the reel base (2107) which is firmly secured to the rod, with the reel body (2108). The connecting arm (2106) in this embodiment is fabricated, e.g. by milling, to create a coupled dual beam spring element within which two dual strain gages (Sgl & Sgr) are attached. The strain gages are affixed to the two beams (B1 & B2) defined by opposed edges of the hole (h1) through the connecting arm. As in the other embodiments, the strain gages are connected to the electronics (2109), e.g. with wires (2104). The electronics is powered by a battery (2105) and displays the line tension on an LCD (2102). A switch (2103) allows the electronics to be turned on and off. In this embodiment, when the line is pulled from the spinning reel, against the drag, in the direction represented by the force arrow F, the strain gages (Rcl, Rtl, Rcr, Rtr) generate a response proportional to the force. As described above, the strain gages are configured into a Wheatstone bridge and the electronics package amplifies and converts the Wheatstone bridge output to a force in pounds or kilos which is displayed on the LCD display (2102).

While the subject matter has been particularly shown and described with reference to exemplary embodiments thereof, it will be understood by those skilled in the art that various changes in form and details may be made therein without departing from the spirit and scope of the invention. For example, rather than a motor to control the active drag mechanism, a piezo element or other type of actuator could be employed. The active feedback loop could be collocated and integrated into the force measurement device on the fishing rod and directly connected to the reel. The receiver could be connected directly to the force measurement device on the rod rather than through radio transmission.

What is claimed is:

1. A fishing reel system, comprising:
   a reel support structure comprising a reel frame portion having a reel foot section and a plurality of beam structures disposed on opposing sides of said reel foot section, said reel support structure further including left and right side plate portions;
   a line spool with a spool rotation axis disposed within said reel support structure;
   said plurality of beam structures directly connect said reel foot section to said left and right side plate portions;
   said line spool rotatably mounted between said left and right side plate portions, said line spool configured to wind fishing line entering said reel support structure from a first direction;
   said reel support structure further comprising a reel foot structure adapted for mounting to a fishing rod, wherein said reel foot structure is mechanically coupled to said reel frame portion at said reel foot section; and
   a force measurement device configured to produce an electronic response signal resulting from a line tension force exerted on said line spool along said first direction, said force measurement device configured to produce a signal resulting from a flexing of, or strain within, at least one of said plurality of beam structures.

2. The system of claim 1, wherein said reel foot structure is adapted for mounting to a fishing rod with a primary longitudinal axis, wherein said first direction is generally parallel to said primary longitudinal axis of the fishing rod.

3. The system of claim 1, wherein said force measurement device comprises one or more strain gauges attached to said plurality of beam structures.

4. The reel system of claim 1, wherein said force measurement device comprises a plurality of strain gauges, wherein at least one of said plurality of strain gauges is attached to at least one of said plurality of beam structures.

5. The reel system of claim 4, wherein said force measurement device includes a full Wheatstone bridge circuit, and said plurality of strain gauges is configured in said bridge circuit.

6. The system of claim 1, further comprising a visual display, said visual display configured to display a value based on said response of said force measurement device.

7. The reel system of claim 1, further comprising:
   a transmitter electrically coupled to the force measurement device for transmitting data representative of said measured force; and
   a receiver for receiving said transmitted data.

8. The reel system of claim 1, further comprising a measurement electronics module, the force measurement device electrically connected to the measurement electronics module.

9. A fishing reel system, comprising:
   a reel support structure comprising a reel frame and a line spool with a spool rotation axis;
   said line spool rotatably mounted within said reel frame, said line spool configured to wind fishing line entering said reel from a first direction;
   said reel support structure further comprising a reel foot structure adapted for mounting to a fishing rod, wherein said reel foot structure is directly connected to said frame;
   a force measurement device configured to produce an electronic response signal resulting from a line tension force exerted on said line spool along said first direction, said force measurement device configured to produce a signal resulting from a flexing of, or strain within, said reel support structure; and
   a position sensor supported by the reel support structure for sensing a position of the reel system in relation to the horizon and a measurement electronics module supported by the reel support structure responsive to a position signal from said position sensor and to a force signal generated by said force measurement device, said measurement electronics module configured to compensate an output of said force measurement device in dependence upon the position signal.

10. The reel system of claim 9, wherein said position sensor includes an accelerometer.

11. The reel system of claim 9, wherein said electronics module is configured to compensate said output of said force measurement device for a weight of said reel system.

12. The reel system of claim 11, wherein said electronics module is further configured to compensate said output of said force measurement device for friction between the fishing line and line guides of the fishing rod.

13. A reel frame system for a fishing reel, comprising:
   a reel frame structure for rotatably supporting a line spool with a spool rotation axis, the line spool configured to wind fishing line entering the reel from a first direction;
   the reel frame structure comprising a reel frame having a reel foot section and opposed left and right side plate structures attached to the reel frame at respective left and right side support sections of the reel frame;
   said left and right side support sections of said reel frame directly connected to said reel foot section only by a plurality of beam structures;
   a force measurement device configured to produce an electronic response signal resulting from a line tension force exerted on the line spool, said force measurement device configured to produce a signal resulting from a flexing of, or strain within, at least one of said plurality of beam structures.

14. The system of claim 13, wherein said force measurement device comprises one or more strain gauges attached to said at least one of said plurality of beam structures.

15. The system of claim 13, wherein said force measurement device comprises a plurality of strain gauges, wherein at least one of said plurality of strain gauges is attached to a corresponding one of said beams.

16. The system of claim 13, wherein said plurality of beam structures comprises first and second left side beams connecting the reel foot section to the left side support section, and third and fourth right side beams connecting the reel foot section to the right side support section.

17. The system of claim 16, wherein said first, second, third and fourth beams are generally parallel to the spool rotation axis.

18. The system of claim 16, wherein said force measurement device comprises a first strain gauge attached to said first beam and a second strain gauge attached to said third beam.

19. The system of claim 13, wherein said plurality of beam structures comprises first and second left side beams connecting the reel foot section to the left side support section, and third and fourth right side beams connecting the reel foot section to the right side support section.

20. The system of claim 19, wherein said first, second, third and fourth beams are generally parallel to the spool rotation axis.

21. The system of claim 19, wherein said force measurement device comprises a first strain gauge attached to said first beam and a second strain gauge attached to said third beam.

* * * * *